(12) United States Patent
Nakamura et al.

(10) Patent No.: US 8,860,863 B2
(45) Date of Patent: Oct. 14, 2014

(54) IMAGE PICKUP METHOD AND IMAGE PICKUP APPARATUS

(75) Inventors: Kazuhiko Nakamura, Tokyo (JP); Yutaka Muto, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 695 days.

(21) Appl. No.: 13/110,332

(22) Filed: May 18, 2011

(65) Prior Publication Data

US 2011/0216223 A1    Sep. 8, 2011

Related U.S. Application Data

(63) Continuation of application No. PCT/JP2009/006890, filed on Dec. 15, 2009.

(30) Foreign Application Priority Data

Dec. 24, 2008  (JP) .................................. 2008-328384

(51) Int. Cl.
*H04N 5/335* (2011.01)
*H04N 5/361* (2011.01)

(52) U.S. Cl.
CPC .............. *H04N 5/361* (2013.01); *H04N 5/335* (2013.01)
USPC ............................ 348/315; 348/311; 348/243

(58) Field of Classification Search
CPC ........................... H04N 5/2329; H04N 5/2353
USPC .......... 348/294, 297, 298, 241–246, 311–324
See application file for complete search history.

(56) References Cited

U.S. PATENT DOCUMENTS

| 6,812,960 | B1 | 11/2004 | Komobuchi et al. |
|---|---|---|---|
| 2007/0153103 | A1 | 7/2007 | Shibasaki |
| 2007/0263094 | A1 | 11/2007 | Fukushima |
| 2008/0024637 | A1* | 1/2008 | Imamura ....................... 348/308 |

(Continued)

FOREIGN PATENT DOCUMENTS

| JP | 767038 | 3/1995 |
|---|---|---|
| JP | 11225286 | 8/1999 |

(Continued)

OTHER PUBLICATIONS

Office Action dated Jul. 9, 2013 issued in corresponding Japanese application No. 2010-543809.

(Continued)

*Primary Examiner* — Tuan Ho
(74) *Attorney, Agent, or Firm* — Bacon & Thomas, PLLC

(57) ABSTRACT

An image pickup method using an image pickup apparatus having a charge coupled device (CCD) image pickup device, the method includes: acquiring an effective pixel signal from effective pixels of a light-receiving face of the CCD image pickup device; acquiring a signal outputted from shaded pixels of the light-receiving face to calculate a representative value of the signal; controlling a variable gain amplification above a vertical period of the effective pixel signal in plus correlation with an average above the vertical period of the representative value; and controlling a variable gain amplification of a horizontal period of the effective pixel signal in minus correlation with a ratio between a value of a horizontal period of the representative value or a recursive average in screens of the representative value and an average above a vertical period of the representative value.

21 Claims, 17 Drawing Sheets

(56) References Cited

U.S. PATENT DOCUMENTS

| | | |
|---|---|---|
| 2008/0074526 A1 | 3/2008 | Nakamura |
| 2011/0019036 A1* | 1/2011 | Okado .......................... 348/243 |
| 2012/0038805 A1* | 2/2012 | Kelly et al. .................. 348/300 |

FOREIGN PATENT DOCUMENTS

| | | |
|---|---|---|
| JP | 2000-152098 A | 5/2000 |
| JP | 2002232382 | 8/2002 |
| JP | 2003115787 | 4/2003 |
| JP | 2007-150828 A | 6/2007 |
| JP | 2007150770 | 6/2007 |
| JP | 2007318735 | 12/2007 |
| JP | 2008109639 | 5/2008 |
| JP | 4107824 | 6/2008 |

OTHER PUBLICATIONS

TC246RGB-B0, 680 x 500 Pixel Impactron Primary Color CCD Image Sensor, SOCS087-Dec. 2004-Revised Mar. 2005.

Longevity in EMCCD and ICCD, Part I-EMCCD RealGain, Anti-Ageing & EMCAL, www.andor.com.

International Search Report and Written Opinion.

* cited by examiner

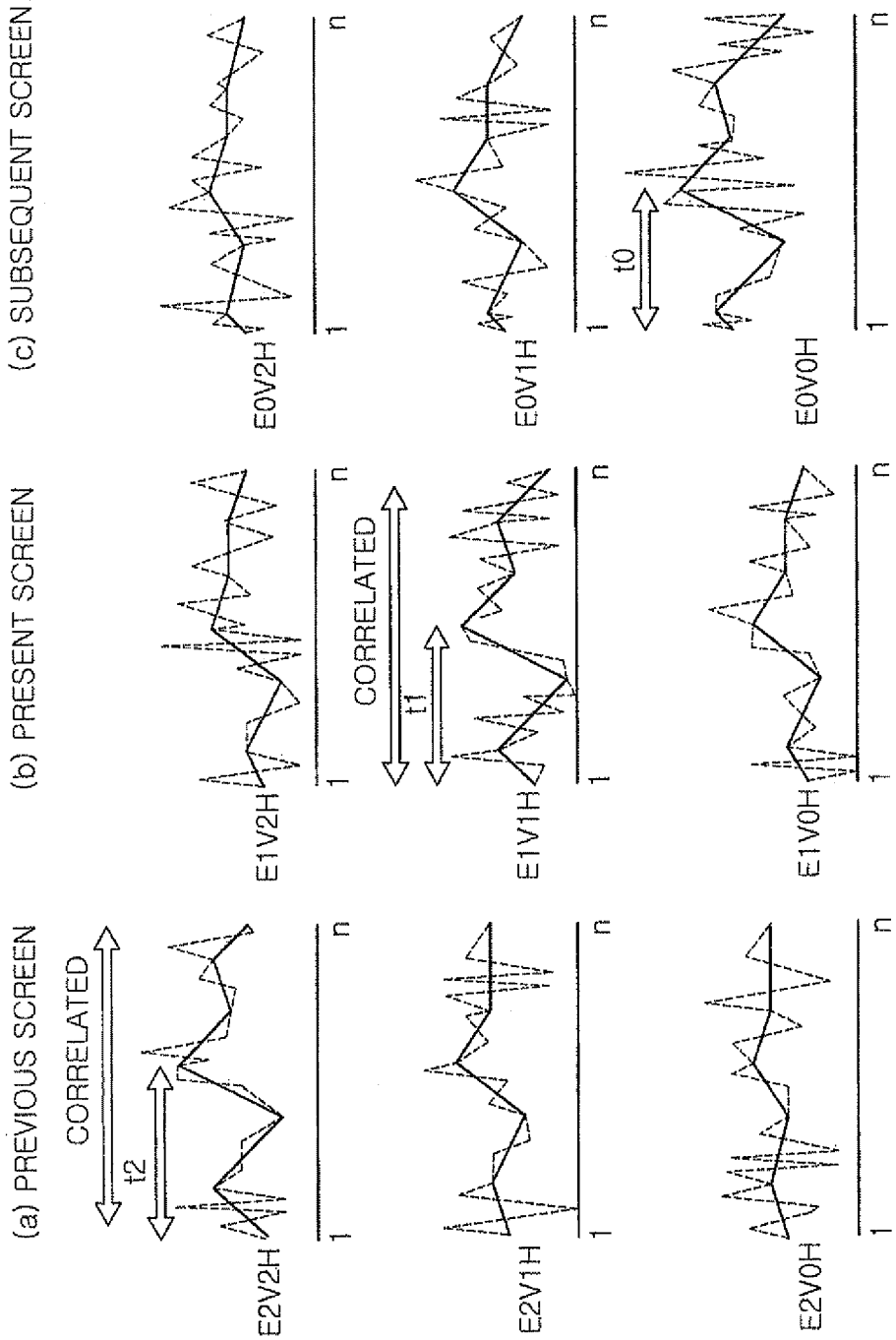

FIG. 4C

[Equation 1]

$$Y1 = \sum_{t=t2-t1}^{n-t2+t1} \left\{ \frac{E2V2H(t-1+t2-t1) + E2V2H(t+t2-t1) + E2V2H(t+1+t2-t1)}{E1V1H(t-1) + E1V1H(t) + E1V1H(t+1)} \right\}^2 \frac{n}{n-t1+t2}$$

[Equation 2]

$$Y2 = \sum_{t=t2-t1}^{n-t2+t1} \left\{ \frac{E2V2H(t-1+t2-t1) + E2V2H(t+t2-t1) + E2V2H(t+1+t2-t1)}{-E1V1H(t-1) - E1V1H(t) - E1V1H(t+1)} \right\}^2 \frac{n}{n-t1+t2}$$

[Equation 3]

$$Z = \sum_{t=t2-t1}^{n-t2+t1} \{E2V2H(t+t2-t1) - E1V1H(t)\}^2 \, n/(n-t1+t2)$$

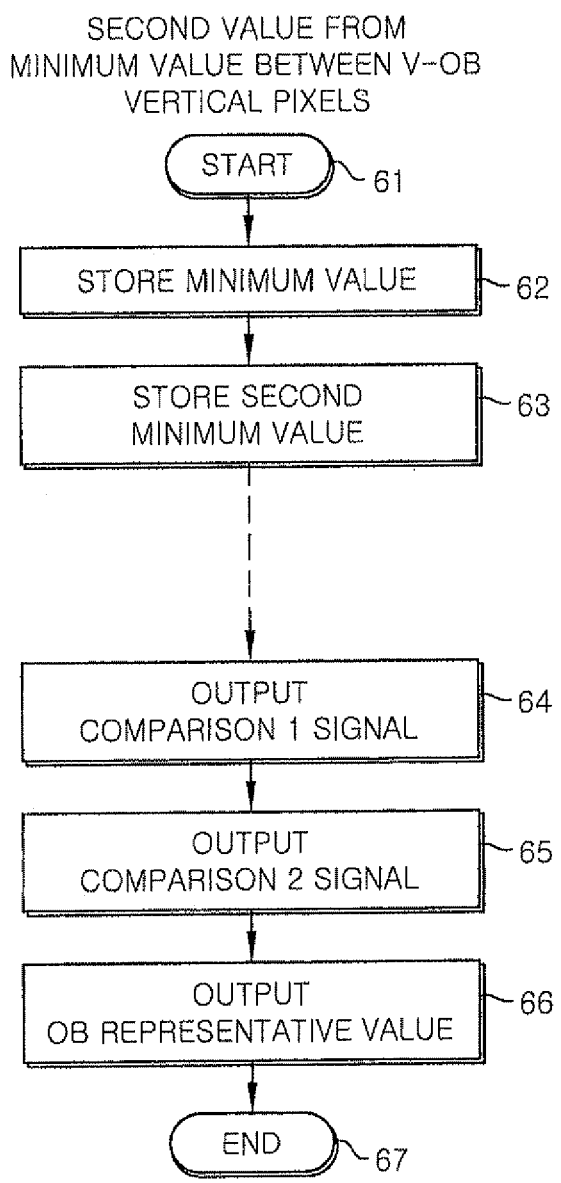

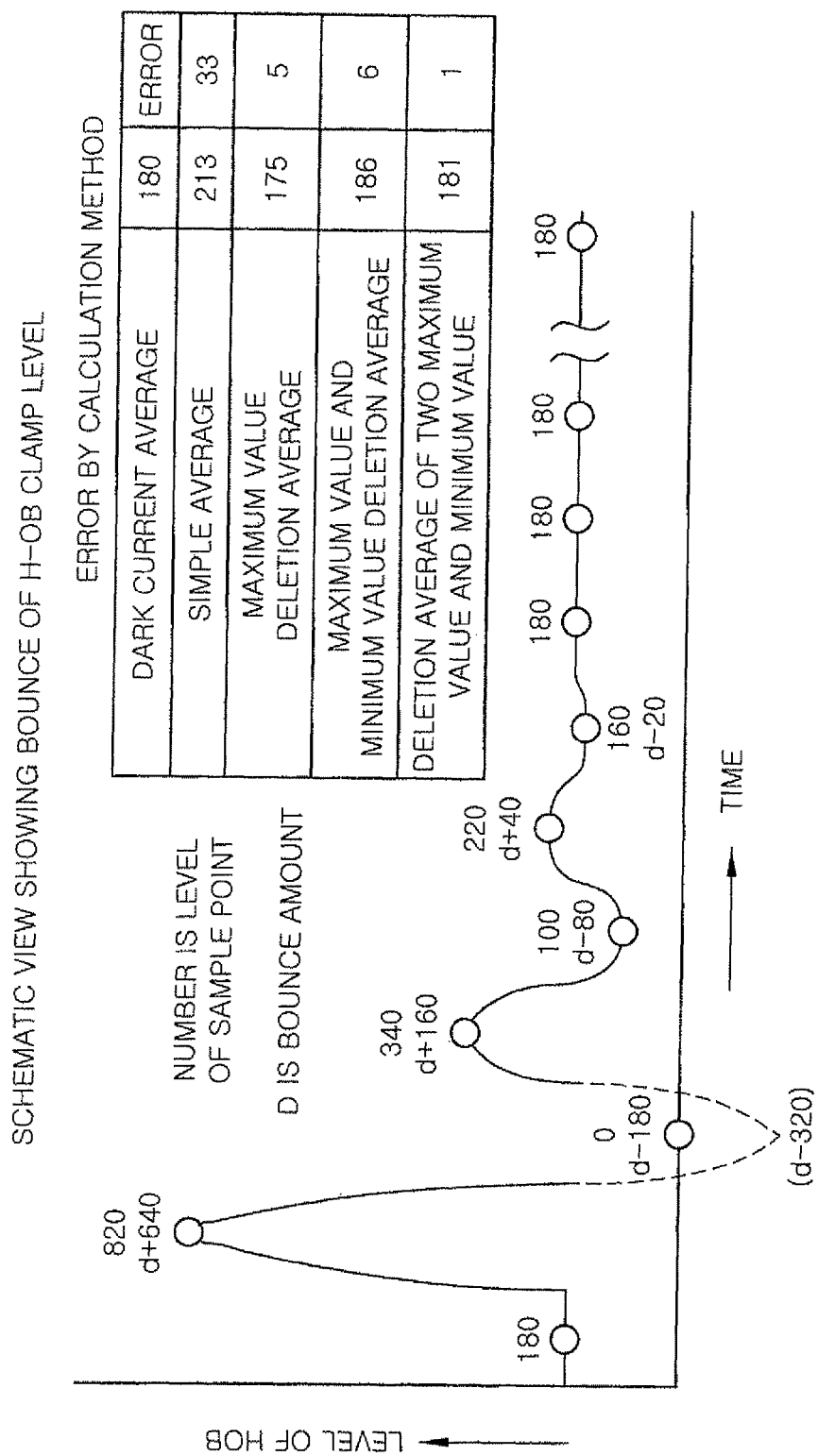

IMAGE PICKUP METHOD AND IMAGE PICKUP APPARATUS

This application is a Continuation Application of PCT International Application No. PCT/JP2009/006890 filed on 15 Dec. 2009, which designated the United States.

FIELD OF THE INVENTION

The present invention relates to an image pickup apparatus having a solid image pickup device; and, more particularly, to a method for reducing the aliasing of an image signal outputted from an image pickup device.

BACKGROUND OF THE INVENTION

Among solid image pickup devices, a CCD (Charge Coupled Device) image pickup device has a high sensitivity and a small amount of white blemishes. However, when the CCD image pickup device is at a high temperature or captures an image with high sensitivity and accumulates it, the CCD image pickup device has a large amount of white blemishes.

Thus, the related art has little pixel defect (the so-called white blemish) with a very high dark current. However, the dark current approximately doubles depending on an increase in the temperature of the CCD image pickup device at 6° C. Also, the dark current increases in proportion to an electron multiplication and accumulation time. Thus, the dark current increases when the CCD image pickup device is at a high temperature or captures an image with high sensitivity and accumulates it. Namely, white blemish appears.

In order to reduce the influence of white blemish at an optical black pixel part, respective vertical pixel signals of an output of 12 lines at a vertical-optical black (V-OB) part of the CCD image pickup device are averaged and stored as a signal of one line portion, and the stored signal is subtracted from an output signal of an effective pixel part of the solid image pickup device (see Japanese Patent Application Publication No. 1995-067038).

Also, a solid image pickup apparatus using a CCD image pickup device is promoted to have a reduced vertical smear so that the CCD image pickup device cannot be affected by a dark current or a high level compression caused by the defective pixel such as white blemish generated in the CCD image pickup device.

Thus, the following (1) or (2) may be performed.

(1) An average signal of respective vertical pixels (V-OB) signals of four lines of a vertical light block image is calculated, their horizontal signals are averaged, a low level and a high level are compressed, and it is subtracted from an image signal outputted from effective pixels of a light receiving face of the CCD image pickup device (see Japanese Patent Application Publication No. 2007-150770).

(2) A dark current unevenness in a vertical direction of a screen of four lines of the vertical light block pixel (V-OB) signal is corrected. Next, a second value from a minimum value of the respective vertical pixel signals of the 4 lines of the vertical light block image V-OB is calculated and stored as a vertical smear correction signal, and it is subtracted from an image signal after performing AGC (Automatic Gain Control) on the effective pixels of the light receiving face of the CCD image pickup device. Also, a signal outputted from the solid image pickup device is converted from analog to digital having 14 bits, the representative value signal is calculated and attenuated into 15/16, and it is subtracted from an image signal outputted from the effective pixels of the light receiving face of the CCD image pickup device (see Japanese Patent Application Publication 2008-109639).

Further, with an increase in the integration degree of a digital signal processing circuit, the storing and the arithmetic process of output signals of a plurality of lines can be easily realized not only in a memory integrated DSP (Digital Signal Processor) dedicated for use of a video image but also in a reasonable general-purpose FPGA (Field Programmable Gate Array). However, it is required to reduce a gradation (bit number) in a signal processing to suppress the increase in the volume of circuit.

Further, an FEP (Front End Processor) has been spread. The FEP includes therein a CDS (Correlated Double Sampling) for removing noises from a signal outputted from the CCD image pickup device, a variable gain amplification (automatic gain control: AGC) unit for correcting a dark current and adjusting gain, and an ADC (Analog-to-Digital Converter) for converting the signal into a digital video signal Vi. Although a gradation of the ADC of the FEP has conventionally been equal to 10 bits, a gradation of 12 or 14 bits is generally used and a processor having a gradation of 16 bits has also been realized as a product. The FEP in which the gradation of the ADC is set to 22 bits and an AGC unit is arranged behind the ADC has also been realized as a product. Low band noise is noticeable when the FEP in which the ADC has the gradation of 12 bits is combined with a ⅔ type CCD image pickup device for NTSC (National Television System Committee) having a wide dynamic range.

On the other hand, low band noise is not noticeable when the FEP in which the ADC has the gradation of 14 bits is combined with an output signal of the ⅔ type CCD image pickup device for NTSC having the wide dynamic range. However, even in the FEP in which the ADC has the gradation of 14 bits, some low band noise is noticeable at 74 MHz having small timing margin when the PEP is combined with a ⅔ type CCD image pickup device for HDTV (High Definition Television), for example, although 36 among 55 number of H-OB (Horizontal-Optical Black) are clamped. Moreover, a DNRIC (Digital Noise Reduction Integrated Circuit) system having a frame memory therein has come into the market.

The hand-trembling electronic correction is performed by reading out a video signal stored in an image memory from a position that is moved horizontally and vertically by the hand-trembling and combining the video signal and a movement detecting signal such that the identical points of an original target are overlapped.

In an OFDM (Orthogonal Frequency Division Multiplexing) image transfer including guard band which repeats a part of an effective signal, FPGA is used and a received OFDM signal is complex-multiplied with the OFDM signal delayed for a period of effective symbol and is added to the result. Further, the absolute value of I component and the absolute value of Q component of guard correlation are added, and a level of the received signal is computed from a square value of a peak value or from the mean value of a square root value of the square value (refer to Japanese Patent Application Publication No. 2003-115787).

Further, in the OFDM transfer, a received OFDM signal is complex-multiplied with the OFDM signal delayed for a period of effective symbol and is added to the result, and thereby carries out a correlation operation. Thereafter, a peak position of the absolute value of a correlation signal obtained by the correlation operation is detected, the absolute value of I component and the absolute value of Q component of the correlation signal at the detected peak position is calculated and added, a peak value is calculated, and a level of the received signal is calculated from a addition-and-average value of either square value of the peak value or a square root value of the square value (refer to Japanese Patent Application Registration No. 4107824).

Also, an electron multiplying CCD (EM-CCD) can have increased sensitivity by being combined with an electron cooling unit, so such can monitor quasi-video for nighttime image capturing of visible light and near infrared light.

The EM-CCD can increase sensitivity by being combined with electron cooling. For example, when an amplitude voltage of electron multiplying electrode (hereinafter, referred to as a 'CMG') of the EM-CCD is increased 0.1V, the amplification rate is increased 1.4 times, and when the temperature of the EM-CCD is lowered 11° C., electron multiplication factor is increased 1.8 times. Thus, a voltage amplitude of a driving waveform is required to be secured, a high stability is required, and heating is required to be reduced. Namely, power consumption needs to be reduced.

Also, the electron multiplication factor is highly correlated to the amplitude voltage of the CMG, and is generated with the probability of 0 to 2% per CMG one end. For example, when the electron multiplication factor is 1% per one end, 640 ends of the CMG of the EM-CCD has an electron multiplication factor of 583 times as 649 multiplication of "1.01". Therefore, when the amplitude voltage of the CMG is increased 0.1V, the electron multiplication factor of the EM-CCD is increased 1.4 times. Thus, the electron multiplication factor is irregularly fluctuated at a very low frequency, and image signals are irregularly modulated, generating aliasing. Also, when a multiplication sensitivity of a low incident light amount level side of the electron multiplication is increased, noise on an image of the screen is conspicuous even to the naked eyes, and the effective sensitivity is drastically degraded. Further, in case of high electron multiplication, the electron multiplication factor is degraded because of accumulation of the product of the high electron multiplication factor and the incident light amount. Thus, the amplitude of the CMG voltage must be necessarily minimized by electron-cooling the EM-CCD more intensively (see Non-Patent Document 1, Non-Patent Document 2, and Non-Patent Document 3). However, the EM-CCD needs to be used in a hermetically closed state, a heat generation unit must be electron-cooled, and an image pickup apparatus itself is accommodated in a hermetically closed space, and air is convection-circulated with a cooling fan. Thus, heat releasing is difficult and the cooling effect of the electron cooling is small.

However, in an image pickup apparatus such as a television camera using the EM-CCD, there may occurs a case where a cooling unit included in the EM-CCD is not able to cool or heat anymore due to an influence of the surrounding temperature. In this case, to keep a constant sensitivity of the EM-CCD, a method has been disclosed that detects a temperature of EM-CCD and controls the electron multiplication factor based on the detected temperature (see Japanese Patent Application Publication No. 2007-318735).

[Non-Patent Document 1] T I TC246RGB-B0680x 500 PIXEL IMPACTRON™ PRIMARY COLOR CCD IMAGE SENSOR SOCS087—DECEMBER 2004—REVISED MARCH 2005

[Non-Patent Document 2] Hamamatsu Photonics Principle and Technology of High Sensitivity Cameras Cat No. SCAS0020J01 DECEMBER 2006 (summary of electron multiplication factor)

[Non-Patent Document 3] ANDOR Technical Note Longevity in EMCCD and ICCD Part I-EMCCD 14 Mar. 2006 (measures for preventing deterioration of electron multiplication factor as time elapses)

In the abovementioned technologies, the electron multiplication factor is degraded by an accumulation of the product between the electron multiplication factor and the quantity of incident light, as time elapses. Therefore, not only the effective sensitivity is further degraded but also detection of dark current proportional to electron multiplication factor is difficult.

Further, as described above, an amplification factor increases 1.4 times when an amplitude voltage of CMG of EM-CCD rises by 0.1 V, the electron multiplication factor increases 1.8 times when a temperature of EM-CCD lowers by 11° C. For this reason, it is required for the image pickup apparatus using EM-CCD to guarantee a voltage amplitude of driving waveforms and high stability and to suppress heat generation (i.e., to reduce power consumption). Also, since dark current is also electron-multiplied, unevenness of dark current on the screen are seen like opaque glass, and in the event of the high electron multiplication, the electron multiplication factor is degraded by an accumulation of the product between the electron multiplication factor and the quantity of incident light. Thus, it is difficult to correct the unevenness of dark current.

In addition, since the electron multiplication occurs stochastically, the electron multiplication irregularly changes at a very low frequency, aliasing that unevenness of dark current and an image signal are irregularly modulated at a very low frequency takes, place to become a prominent interdigital type noise, degrading a signal-to-noise (S/N) ratio and drastically lowering the effective sensitivity.

However, it is difficult to precisely correct an irregular 1/f fluctuation.

SUMMARY OF THE INVENTION

In view of the above, the present invention provides an image pickup apparatus using a charge coupled device (CCD) image pickup device which can improve an effective sensitivity.

In accordance with the present invention, there is provided an image pickup method using an image pickup apparatus including a CCD image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, and a subtraction unit for performing a variable gain amplification of the stored dark current component outputted from the effective pixels and subtracting it from the effective pixel signal, the method including: controlling a variable gain amplification above a vertical period of the effective pixel signal in plus correlation with an average above the vertical period of the representative value of the signal outputted from the shaded pixels; and controlling a variable gain amplification of a horizontal period of the effective pixel signal in minus correlation with a ratio between a value of the horizontal period of the representative value and the average above the vertical period of the representative value or a ratio between a recursive average in screens of the representative value and the average above the vertical period of the representative value.

In accordance with the present invention, there is provided an image pickup method using an image pickup apparatus including a CCD image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, and a subtraction unit for performing a variable gain amplification of the stored dark current component outputted from the effective pixels and subtracting it from the effective pixel signal, the method including: controlling, based on a vertical period of the representative value of the signal outputted from the shaded pixels, a variable gain amplification of the vertical period of the dark current component of the effective pixel signal to subtract it from the effective pixel signal; and controlling a variable gain amplification of the effective pixel signal in plus correlation with a recursive average between screens of the representative value.

In accordance with the present invention, there is provided an image pickup method using an image pickup apparatus including an electron multiplying-CCD image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, and a variable voltage electron multiplying electrode driving unit, the method including: performing at least one of controlling, based on a vertical period of the representative value, a variable gain amplification of the vertical period of the dark current component of the effective pixel signal to subtract it from the effective pixel signal, and controlling a variable gain amplification of a horizontal period of the dark current component of the effective pixel signal, in plus correlation with a ratio between a value of the horizontal period of the representative value and an average above the vertical period of the representative value or a ratio between a recursive average in screens of the representative value and the average above the vertical period of the representative value, to subtract it from the effective pixel signal; multiplying a ratio between a present value of the representative value of the signal outputted from the shaded pixels acquired by the second acquisition unit and an assumption value of the dark current which is obtained by correcting, with a temperature detected by the image pickup device, the representative value of the signal outputted from the shaded pixels acquired by the second acquisition unit and stored at as low electron multiplying electrode voltage as the electron multiplication is not performed by a reference dark current of the effective pixels stored when a non-electron multiplication was performed to subtract it from the effective pixel signal.

Further, the image pickup apparatus further includes a temperature measuring unit and the image pickup device has a vertical-optical black (V-OB) and a horizontal-optical black (H-OB), and the method further includes: performing at least one of multiplying a ratio between a present representative value of the dark current of the V-OB and an assumption value of the dark current obtained by correcting, with a temperature measured by the image pickup device, a representative value of the dark current of the V-OB stored when the non-electron multiplication was performed by a reference dark current of each effective pixel stored within a screen memory when the non-electron multiplication was performed, to subtract it from the effective pixel signal; setting as a vertical smear a difference between maximum and minimum value of representative values between vertical pixels of present V-OB, and multiplying, if the vertical smear is less than a predetermined value, a ratio between a present representative value of the dark current of the H-OB and the assumption value of the dark current obtained by correcting, with the temperature measured by the image pickup device, the representative value of the dark current of the H-OB stored when the non-electron multiplication was performed by the reference dark current of each effective pixel stored within the screen memory when the non-electron multiplication was performed to subtract it from the effective pixel signal.

In accordance with the present invention, there is provided an image pickup method using an image pickup apparatus including a CCD image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, and a control unit for controlling accumulation time, wherein the screen memory further stores the effective pixel signal outputted from the effective pixels acquired by the first acquisition unit, the method including: controlling a variable gain amplification of a horizontal period of the dark current component of the effective pixel signal, in plus correlation with a ratio between a value of the horizontal period of the representative value of the signal outputted from the shaded pixels and an average above a vertical period of the representative value or a ratio between a recursive average in screens of the representative value and the average above the vertical period of the representative value, to subtract it from the effective pixel signal; and controlling the accumulation time in plus correlation with a recursive average between screens of the representative value.

In accordance with the present invention, there is provided an image pickup method using an image pickup apparatus including an electron multiplying-charge coupled device (CCD) image pickup device, a variable voltage electron multiplying electrode driving unit, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a line memory for storing an effective pixel signal outputted from the effective pixels acquired by the first acquisition unit, and a screen memory for storing an effective pixel signal outputted from the effective pixels acquired by the first acquisition unit, the method including: comparing a square integral of difference of correlated portions between scanning line signals and a square integral of an error of averages of the correlated portions between the scanning line signals which represents a sum of a square integral of a ratio of averages of the correlated portions between the scanning line signals and a square integral of a difference of averages of the correlated portions between the scanning line signals; performing at least any one of increasing an average variable gain amplification above a vertical period, decreasing a variable gain amplification of the vertical period of the effective pixel signal, decreasing a variable gain amplification of a horizontal period of the effective pixel signal, and decreasing an average electron multiplying electrode amplitude value above the vertical period, such that the square integral of difference of the correlated portions between the scanning line signals becomes to equal the square integral of the error of averages of the correlated portions between the scanning line signals.

Further, the image pickup apparatus further includes a temperature measuring unit and the image pickup device has a V-OB and a H-OB, and the method further includes: performing at least any one of averaging within a scanning line an image signal below a predetermined level, averaging within a screen the image signal below the predetermined level, averaging between screens the image signal below the predetermined level, and detecting a correlation between screens of the image signal and a motion vector to average between screens portions having a high correlation in an image signal of the motion vector below the predetermined level having over a predetermined correlation; multiplying a ratio between a present representative value of the dark current of the V-OB and an assumption value of the dark current obtained by correcting, with a temperature measured by the image pickup device, a representative value of the dark current of the V-OB stored when a non-electron multiplication was performed by an average reference dark current of the effective pixels to subtract it from the effective pixel signal.

Further, the image pickup apparatus further includes a temperature measuring unit and the image pickup device has a V-OB and a H-OB, and the method further includes: controlling an intra-screen average value of an electron multiplying electrode amplitude and a variable gain amplification to uniformly control a predetermined level of an image signal, by using at least any one of the ratio (an electron multiplication factor of each vertical period) between a present representative value of the dark current of the V-OB and an assumption value of the dark current obtained by correcting, with a temperature measured by the image pickup device, a representative value of the dark current of the V-OB stored when the non-electron multiplication was performed, the ratio between each V-OH of a multiplication factor of the dark current estimated by dividing it by a value obtained by calculating a representative value of the dark current of the V-OB when the non-multiplication was performed and temperature-correcting it and an average of the previous and subsequent V-OB, the ratio between a square integral of a signal ratio between an 1H line and a line having the highest correlation obtained by detecting correlations between the 1H line and the same line and upper and lower lines of a previous screen and a square integral of the signal difference between the 1H line and the line having the highest correlation, after multiplying a reference dark current of effective pixels of a screen memory by a multiplication factor of a dark current estimated by dividing it by a value obtained by calculating a representative value of the dark current of the V-OB obtained when the non-multiplication was performed and temperature-correcting it, and then subtracting the multiplication value from the effective pixel signal, the ratio between a low frequency component level and a high frequency component level of the signal difference between the 1H line and the line having the highest correlation, and the ratio between a value of a present variable gain amplification and an assumption value of the electron multiplication.

In accordance with the present invention, there is provided an image pickup method using an image pickup apparatus including an electron multiplying-CCD image pickup device, a variable voltage electron multiplying electrode driving unit, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, a temperature measuring unit, a noise removing unit, and a 14-bit or higher analog digital converter, the method including: comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen; and performing at least any one of calculating accumulation of a square of a ratio between non-recursive average components having high correlations, calculating accumulation of a square of a difference between non-recursive average components having high correlations, calculating a ratio between the accumulation of the square of the ratio and the accumulation of the square of the difference, controlling an intra-screen average value of a variable gain amplification and electron multiplying electrode amplitude such that the ratio becomes greater than a predetermined value, and uniformly controlling a predetermined level of an image signal; calculating a ratio between a low frequency component level and a high frequency component level of the square of the difference between non-recursive average components having high correlations, controlling the intra-screen average value of the variable gain amplification and the electron multiplying electrode amplitude such that the ratio becomes greater than the predetermined value, and uniformly controlling the predetermined level of the image signal; and calculating a ratio between a value of a present variable gain amplification and an assumption value of the electron multiplication, controlling the intra-screen average value of the variable gain amplification and the electron multiplying electrode amplitude such that the ratio becomes greater than the predetermined value, and uniformly controlling the predetermined level of the image signal.

In accordance with the present invention, there is provided an image pickup method using an image pickup apparatus including a CCD image pickup device, a first acquisition unit for acquiring an image signal outputted from effective pixels of a light-receiving face of the CCD image pickup device, a second acquisition unit for acquiring a signal outputted from a H-OB of shaded pixels of at least one of left and right portions of the light-receiving face of the CCD image pickup device, a calculation unit for calculating a representative value of the signal outputted from the H-OB of the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, a front end processor (FEP) containing a correlated double sampling unit for removing a noise from a signal outputted from the CCD image pickup device, an automatic gain control unit for adjusting gain of a signal, and an analog digital converter for converting to digital image signal Vi, and a digital image signal processing circuit, the method including: in the digital image signal processing circuit, setting as a H-OB representative value an average of M-N number of H-OB excluding the upper N among M number of H-OB; subtracting the H-OB representative value from an effective pixel signal of a corresponding line; and controlling a variable gain amplification of the FEP in minus correlation with a ratio between the H-OB representative value and an average above a vertical period of the H-OB representative value or a ratio between a recursive average within the vertical period of the H-OB representative value and an average above the vertical period of the H-OB representative value.

In accordance with the present invention, there is provided an image pickup method using an image pickup apparatus including a charge coupled device (CCD) image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portion of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, and a subtractor for performing a variable gain amplification of the stored dark current component of the effective pixel signal and subtracting it from the effective pixel signal, the method including: performing at least one of controlling a variable gain amplification of the effective pixel signal in correlation with the representative value, and controlling a variable gain amplification of the stored dark current component of the effective pixel signal, in plus correlation with the representative value, to subtract it from the effective pixel signal.

Further, the image pickup method further includes: performing at least any one of controlling a variable gain amplification above a vertical period of the effective pixel signal in plus correlation with an average above the vertical period of the representative value; controlling a variable gain amplification of a horizontal period of the effective pixel signal, in minus correlation with a ratio between a value of the horizontal period of the representative value and an average above the vertical period of the representative value or a ratio between a recursive average in screens of the representative value and the average above the vertical period of the representative value; controlling, based on the vertical period of the representative value, a variable gain amplification of the vertical period of the dark current component of the effective pixel signal to subtract it from the effective pixel signal; controlling a variable gain amplification of a horizontal period of the dark current component of the effective pixel signal, in plus correlation with the ratio between the value of the horizontal period of the representative value and the average above the vertical period of the representative value or the ratio between the recursive average in screens of the representative value and the average above the vertical period of the representative value, to subtract it from the effective pixel signal.

Further, the image pickup apparatus further includes an electron multiplying-CCD image pickup device and a variable voltage electron multiplying electrode driving unit, and the method further includes: multiplying a ratio between a present value of the representative value of the signal outputted from the shaded pixels acquired by the second acquisition unit and an assumption value of the dark current which is obtained by correcting, with a temperature detected by the image pickup device, the representative value of the signal outputted from the shaded pixels acquired by the second acquisition unit and stored at as low electron multiplying electrode voltage as the electron multiplication is not performed by a reference dark current of the effective pixels stored when a non-electron multiplication was performed to subtract it from the effective pixel signal.

Further, the image pickup apparatus further includes a temperature measuring unit and the image pickup device has a vertical-optical black (V-OB) and a horizontal-optical black (H-OB), and the method further includes: performing at least one of multiplying a ratio between a present representative value of the dark current of the V-OB and an assumption value of the dark current obtained by correcting, with a temperature measured by the image pickup device, a representative value of the dark current of the V-OB stored when the non-electron multiplication was performed by a reference dark current of each effective pixel stored within a screen memory when the non-electron multiplication was performed, to subtract it from the effective pixel signal; setting as a vertical smear a difference between maximum and minimum value of representative values between vertical pixels of present V-OB, and multiplying, if the vertical smear is less than a predetermined value, the ratio between a present representative value of the dark current of the V-OB and the assumption value of the dark current obtained by correcting, with the temperature measured by the image pickup device, the representative value of the dark current of the V-OB stored when the non-electron multiplication was performed by the reference dark current of each effective pixel stored within a screen memory when the non-electron multiplication was performed to subtract it from the effective pixel signal.

Further, the image pickup apparatus further includes a control unit for controlling accumulation time, and the method further includes: performing at least one of controlling a variable gain amplification of the effective pixel signal in plus correlation with a recursive average between screens of the representative value; and controlling accumulation time in plus correlation with a recursive average between screens of the representative value.

In other words, a multiplication fluctuation due to increase of an electron multiplication factor is suppressed by increasing the variable gain amplification or the accumulation time, thereby reducing fluctuation noises of the image signal.

Further, the image pickup apparatus further includes an electron multiplying-CCD image pickup device and a variable voltage electron multiplying electrode driving unit, and the method further includes: comparing a square integral of difference of correlated portions between scanning line signals and a square integral of an error of averages of the correlated portions between the scanning line signals which represents a sum of a square integral of a ratio of averages of the correlated portions between the scanning line signals and a square integral of a difference of averages of the correlated portions between the scanning line signals; performing at least any one of increasing an average variable gain amplification above a vertical period, decreasing a variable gain amplification of the vertical period of the effective pixel signal, decreasing a variable gain amplification of a horizontal period of the effective pixel signal, and decreasing an average electron multiplying electrode amplitude value, such that the square integral of difference of the correlated portions between the scanning line signals becomes to equal the square integral of the error of averages of the correlated portions between the scanning line signals.

Further, the image pickup apparatus further includes a temperature measuring unit and the image pickup device has a vertical-optical black (V-OB) and a horizontal-optical black (H-OB), and the method further includes: performing at least any one of averaging within a scanning line an image signal below a predetermined level, averaging within a screen the image signal below the predetermined level, averaging between screens the image signal below the predetermined level, and detecting a correlation between screens of the image signal and a motion vector to average between screens portions having a high correlation in an image signal of the motion vector below the predetermined level having over a predetermined correlation; multiplying a ratio between a present representative value of the dark current of the V-OB and an assumption value of the dark current obtained by correcting, with a temperature measured by the image pickup device, a representative value of the dark current of the V-OB stored when a non-electron multiplication was performed by an average reference dark current of the effective pixels to subtract it from the effective pixel signal.

Further, the image pickup apparatus further includes a temperature measuring unit and the image pickup device has a vertical-optical black (V-OB) and a horizontal-optical black (H-OB), and the method further includes: controlling an intra-screen average value of an electron multiplying electrode amplitude and a variable gain amplification to uniformly control a predetermined level of an image signal, by using at least any one of the ratio between a present representative value of the dark current of the V-OB and an assumption value of the dark current obtained by correcting, with a temperature measured by the image pickup device, a representative value of the dark current of the V-OB stored when the non-electron multiplication was performed, the ratio between each V-OH of a multiplication factor of the dark current estimated by dividing it by a value obtained by calculating a representative value of the dark current of the V-OB when the non-multiplication was performed and temperature-correcting it and an average of the previous and subsequent V-OB, the ratio between a square integral of a signal ratio between an 1H line and a line having the highest correlation obtained by detecting correlations between the 1H line and the same line and upper and lower lines of a previous screen and a square integral of the signal difference between the 1H line and the line having the highest correlation, after multiplying a reference dark current of effective pixels of a screen memory by a multiplication factor of a dark current estimated by dividing it by a value obtained by calculating a representative value of the dark current of the V-OB obtained when the non-multiplication was performed and temperature-correcting it, and then subtracting the multiplication value from the effective pixel signal, the ratio between a low frequency component level and a high frequency component level of the signal difference between the 1H line and the line having the highest correlation, and the ratio between a value of a present variable gain amplification and an assumption value of the electron multiplication.

In accordance with the present invention, there is provided an image pickup apparatus including: an electron multiplying-charge coupled device (CCD) image pickup device;

a first acquisition unit for acquiring an image signal outputted from effective pixels of a light-receiving face of the CCD image pickup device; a second acquisition unit for acquiring a signal outputted from shaded pixels of at least one of upper, lower, left, and right portions of the light-receiving face of the CCD image pickup device; an automatic gain control unit; a calculation unit for calculating a representative value of the signal outputted from the shaded pixels acquired by the second acquisition unit; a screen memory for storing a dark current component outputted from the effective pixels acquired by the first acquisition unit; a line memory for storing an effective pixel signal outputted from the effective pixels acquired by the first acquisition unit; a subtraction unit for performing a variable gain amplification of the stored dark current component outputted from the effective pixels and subtracting it from the effective pixel signal; a variable voltage electron multiplying electrode driving unit; a temperature measuring unit; a noise removing unit; a 14-bit or higher analog digital converter; a correlation comparison unit for comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen; a first accumulation unit for calculating accumulation of a square of a ratio between non-recursive average components having high correlations; a second accumulation unit for calculating accumulation of a square of a difference between non-recursive average components having high correlations; at least any one of a first ratio calculation unit for calculating a ratio between the accumulation of the square of the ratio and the accumulation of the square of the difference, a second ratio calculation unit for calculating a ratio between a low frequency component level and a high frequency component level of the square of the difference between non-recursive average components having high correlations, and a third ratio calculation unit for calculating a ration between the value of the present variable gain amplification and the assumption value of the electron multiplication; a first control unit for controlling an intra-screen average value of a variable gain amplification and electron multiplying electrode amplitude such that the ratio becomes greater than a predetermined value; and a second control unit for uniformly controlling a predetermined level of an image signal.

That is, 1/f noises other than the electron multiplication fluctuations is reduced by the use of a 14-bit or higher FEP, and a detection amount having a high correlation with a total of the electron multiplication fluctuations is compared to a detection amount having a high correlation with a total of thermal noises, thereby controlling an intra-screen average value of a variable gain amplification to be increased, an electron multiplying electrode amplitude to be decreased, and a predetermined level of an image signal to be fixed such that a total of 1/f noises of the electron multiplication fluctuations is equal to the total of thermal noises.

Further, the CCD image pickup device has a H-OB, and the image pickup apparatus further includes a digital image signal processing circuit and a front end processor (FEP) containing a correlated double sampling unit for removing a noise from a signal outputted from the CCD image pickup device, a variable gain amplification unit for adjusting a dark current correction and a signal gain, and an analog digital converter for converting to digital image signal Vi, and the method includes: in the digital image signal processing circuit, setting as a H-OB representative value an average of M-N number (where M is a natural number and N is a natural number smaller than M) of H-OB excluding the upper N among M number of H-OB; subtracting the H-OB representative value from an effective pixel signal of a corresponding line; and controlling a variable gain amplification in minus correlation with a ratio between the H-OB representative value and an average above a vertical period of the H-OB representative value or a ratio between a recursive average within the vertical period of the H-OB representative value and an average above the vertical period of the H-OB representative value.

That is, the electron multiplication fluctuations of horizontal period is removed and lateral noises of an image signal is reduced by excluding N number of white blemishes of each H-OB and stabilizing a pedestal level.

BRIEF DESCRIPTION OF THE DRAWINGS

The objects and features of the present invention will become apparent from the following description of embodiments, given in conjunction with the accompanying drawings, in which:

FIG. 4A schematically show outputs of an EM-CCD which indicate signal values of upward, downward, forward and backward sides containing electron multiplication fluctuations and thermal noises in accordance with the embodiment of the present invention;

FIG. 4C shows equations for calculating electron multiplication fluctuations between screens in the present embodiment;

FIG. 5C is a flowchart showing a process for detecting as a representative value a second value from a minimum value of vertical pixels of V-OB (Vertical-Optical Black) in accordance with the embodiment of the present invention;

FIG. 6 is a schematic view showing a bounce of an H-OB clamp level.

DETAILED DESCRIPTION OF THE EMBODIMENT

Figure 1A:
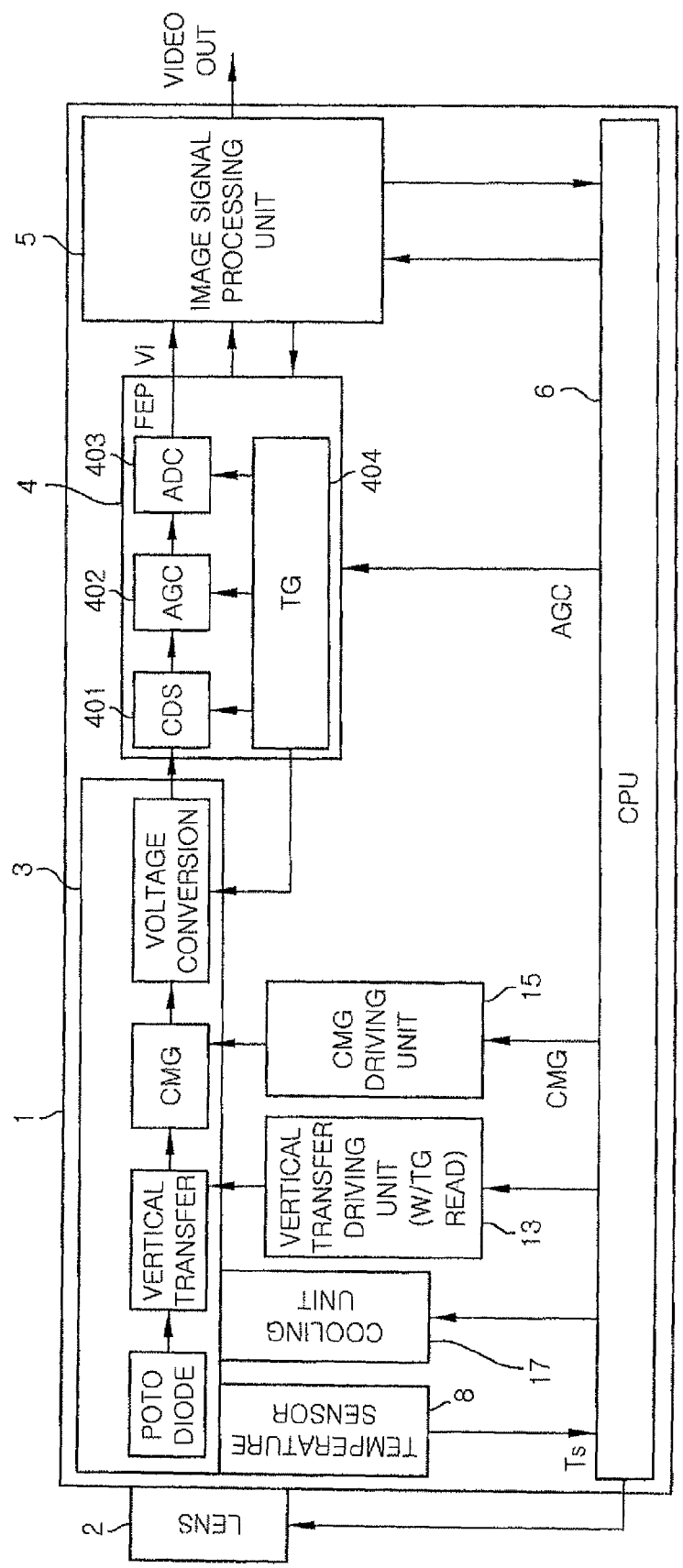
FIG. 1A is a block diagram showing a whole configuration of an image pickup apparatus using a CCD image pickup device including a color separation filter in accordance with an embodiment of the present invention.

Hereinafter, embodiments of the present invention will be described with reference to the accompanying drawings which form a part hereof.

Also, in describing the drawings, the same reference numerals are used for the elements having a common function and a repeated description will be omitted.

Also, the embodiments described below are merely illustrative, rather than limiting the scope of the present invention.

Thus, a person skilled in the art will appreciate that it is possible to employ an embodiment in which respective elements or the entire elements of the embodiment can be replaced with their equivalents, so the corresponding embodiment can be included within the scope of the present invention.

Embodiment 1

An embodiment of the image pickup apparatus of the present invention will be described reference to FIGS. 1A, 1B, 2A, 2B, 3A, 3B, 4A, 4B, 4C, and 5A.

Figure 1B:
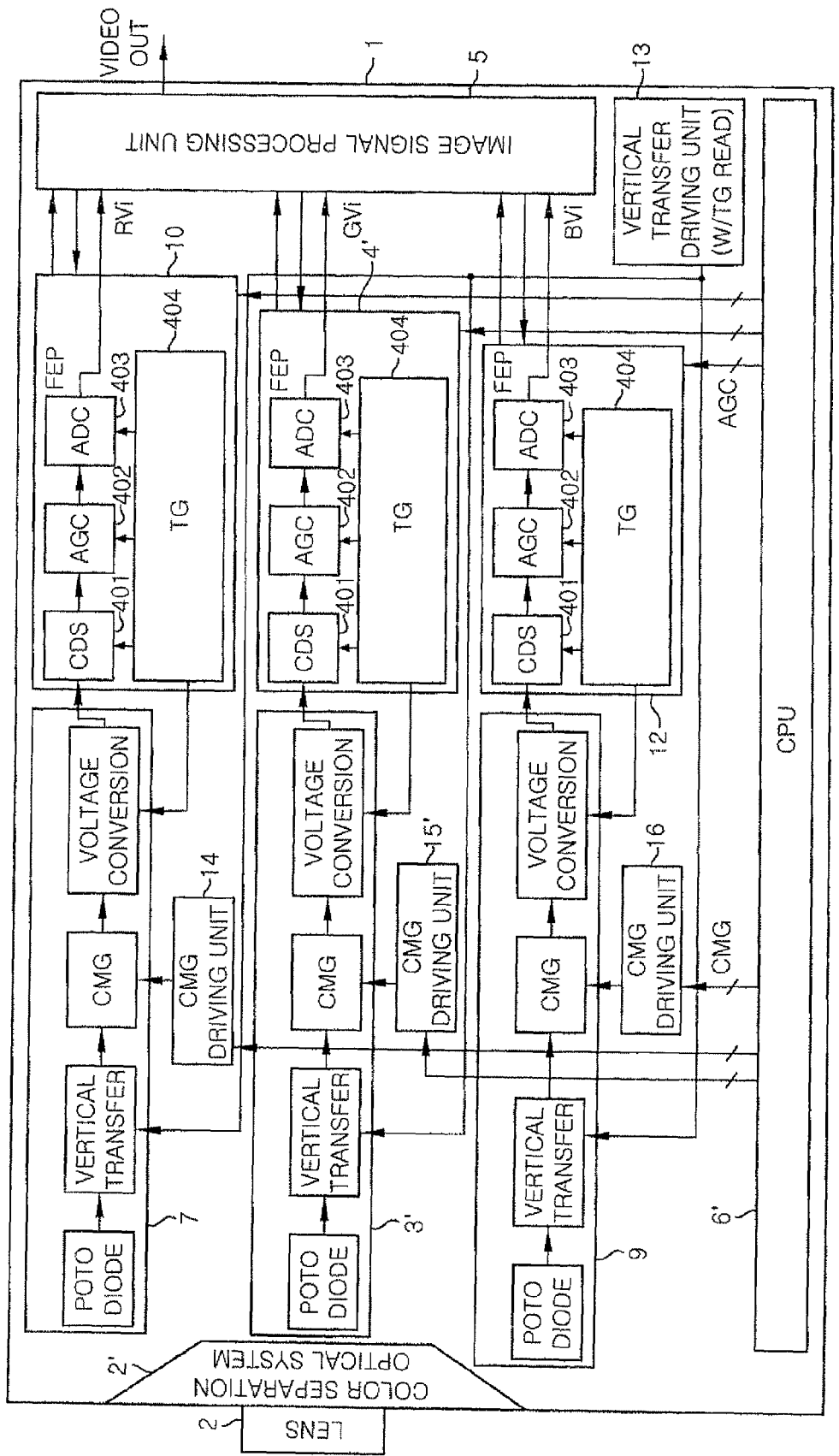
FIG. 1B is a block diagram showing a whole configuration of an image pickup apparatus using a color separating optical system and three CCD image pickup devices in accordance with the embodiment of the present invention.

FIG. 1A is a block diagram showing a whole configuration of an image pickup apparatus using a CCD image pickup device including a color separation filter in accordance with an embodiment of the present invention. FIG. 1B is a block diagram showing a whole configuration of the image pickup apparatus using a color separating optical system and three CCD image pickup devices in accordance with the embodiment of the present invention.

Figure 2A:
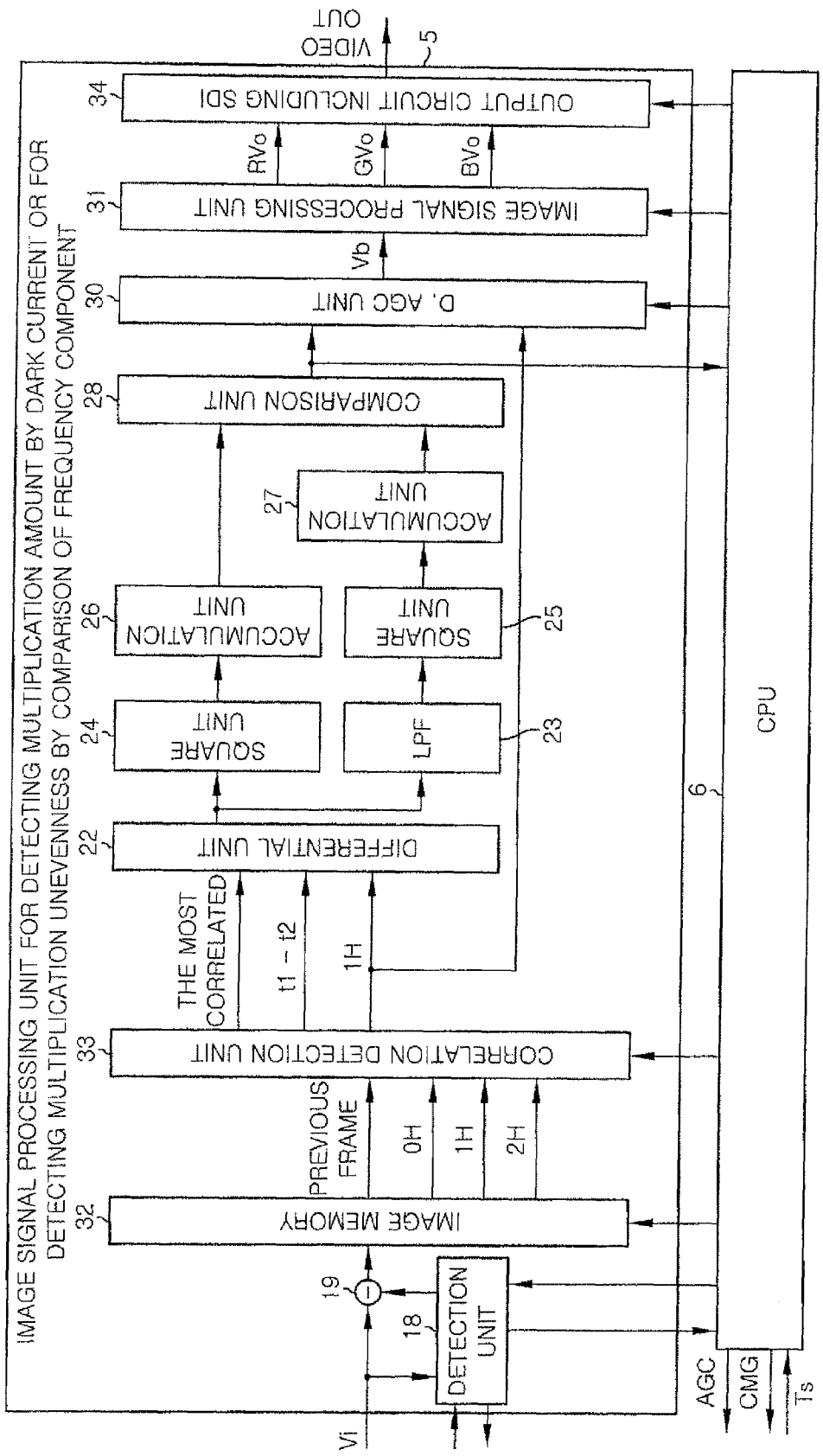
FIG. 2A is a block diagram showing an inner configuration of an image signal processing unit having a detecting operation of a multiplication unevenness in the case of using a CCD image pickup device including a color separation filter in accordance with the embodiment of the present invention.
Figure 2B:
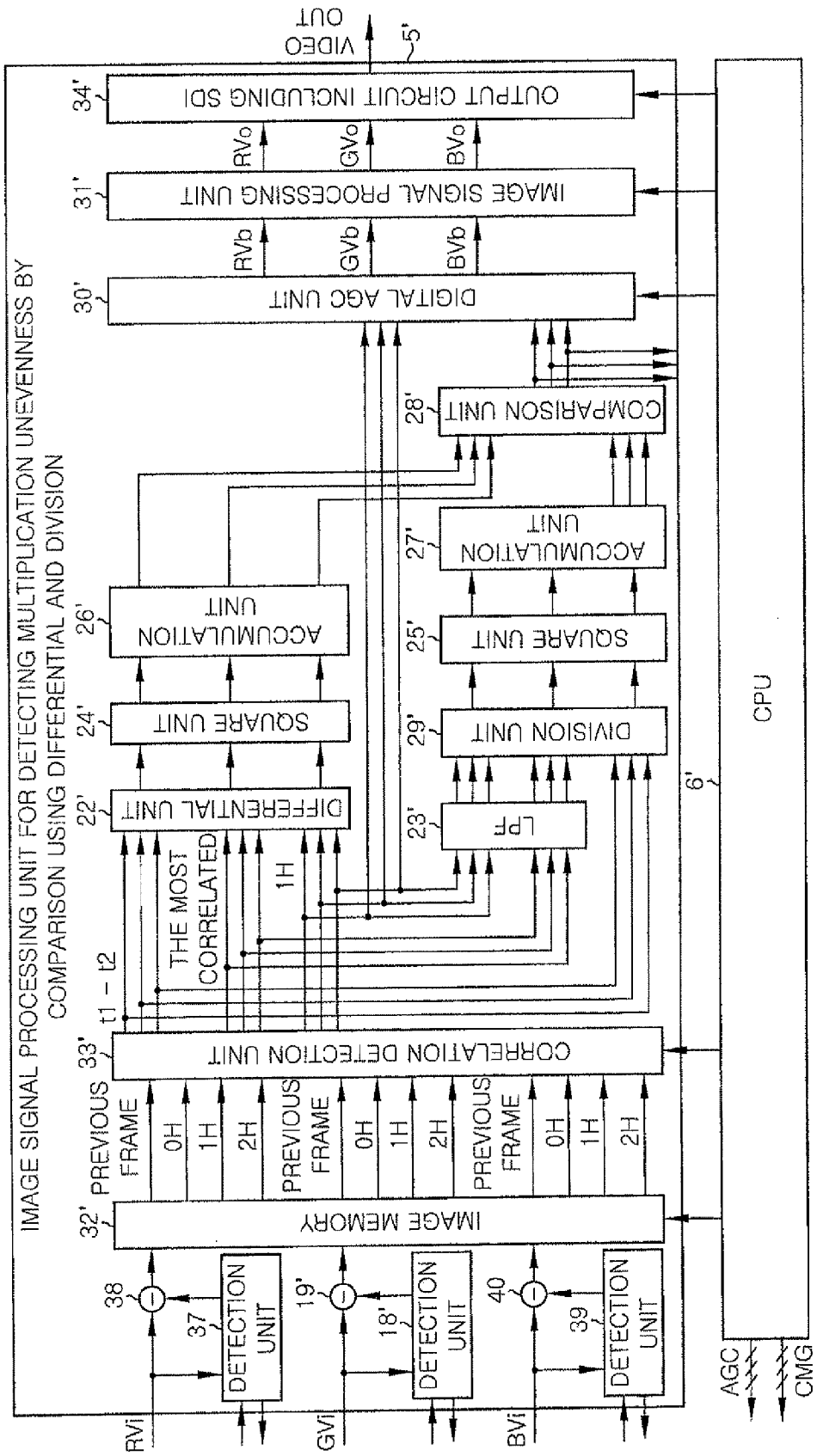
FIG. 2B is a block diagram showing an inner configuration of an image signal processing unit having a detecting operation of a multiplication unevenness in the case of using a color separating optical system and three CCD image pickup devices in accordance with the embodiment of the present invention.

FIG. 2A is a block diagram showing an inner configuration of an image signal processing unit having a detecting operation of a multiplication unevenness in the case of using the CCD image pickup device including a color separation filter in accordance with the embodiment of the present invention. FIG. 2B is a block diagram showing an inner configuration of the image signal processing unit having a detecting operation of the multiplication unevenness in the case of using the color separating optical system and three CCD image pickup devices in accordance with the embodiment of the present invention.

Figure 3A:
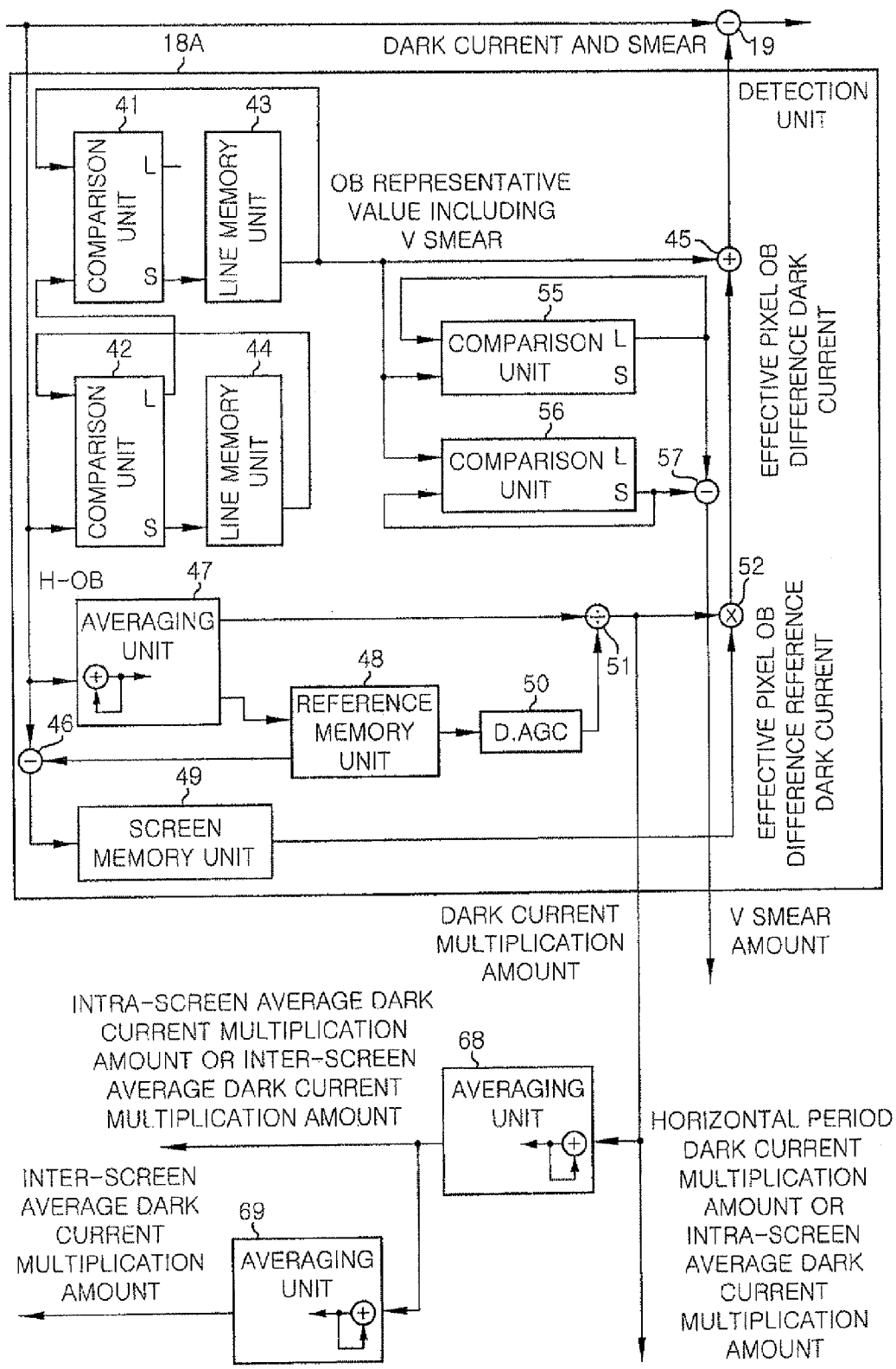
FIG. 3A is a block diagram showing an inner configuration of a detection unit for detecting not only a dark current, a smear and a multiplication unevenness but also a representative value of OB (Optical Black) in accordance with the embodiment of the present invention.
Figure 3B:
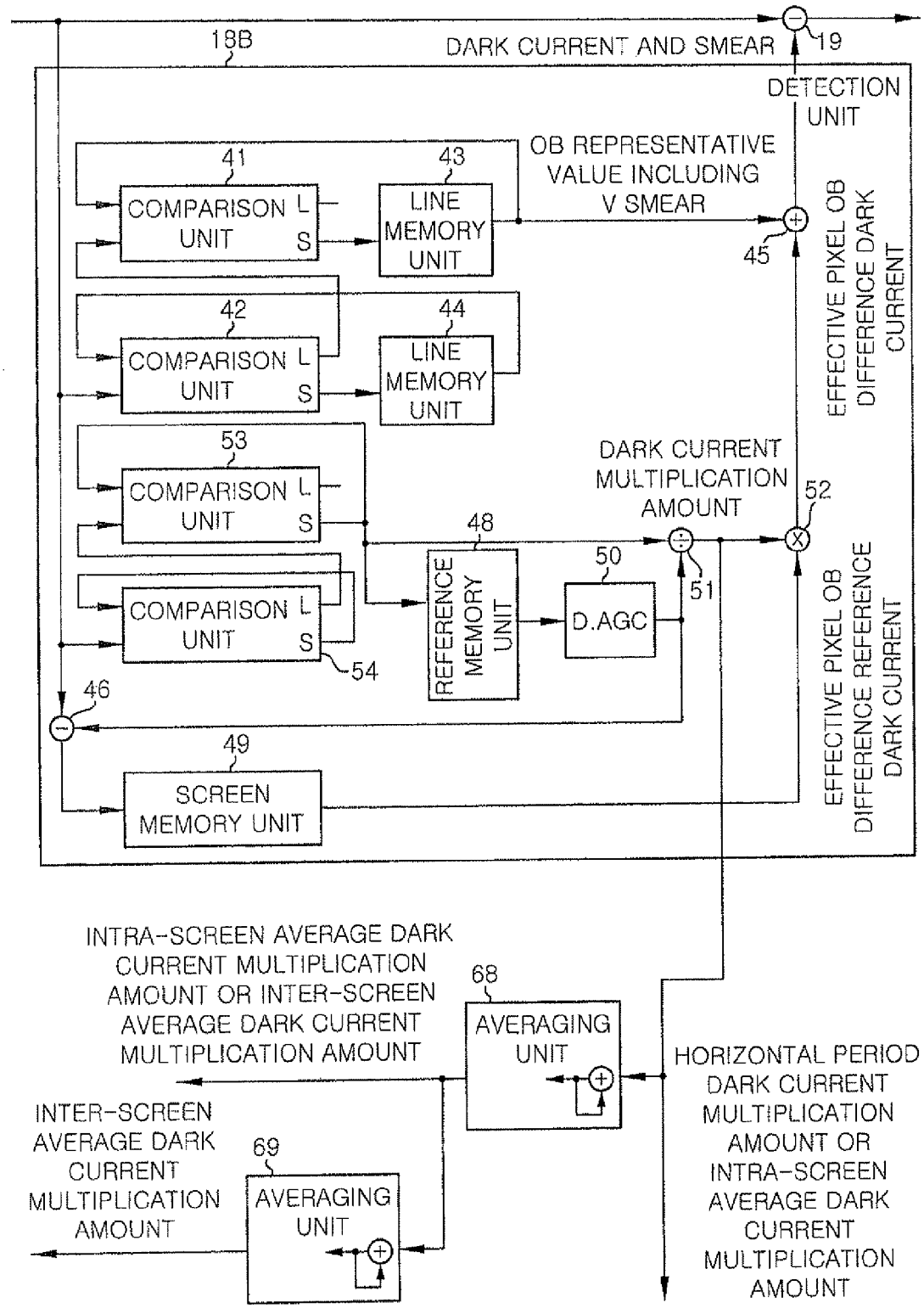
FIG. 3B is a block diagram showing an inner configuration of a detection unit for detecting not only a dark current, a smear and a multiplication unevenness but also a representative value of OB in accordance with the embodiment of the present invention.

FIGS. 3A and 3B are block diagrams showing an inner configuration of a detection unit, within the image signal processing unit of the image pickup apparatus, for detecting not only a dark current, a smear and the multiplication unevenness but also a representative value of OB (Optical Black) in accordance with the embodiment of the present invention. Also, an averaging unit 68 and 69 shown in FIGS. 3A and 3B will be described in embodiments 2 and 3.

Figure 4B:
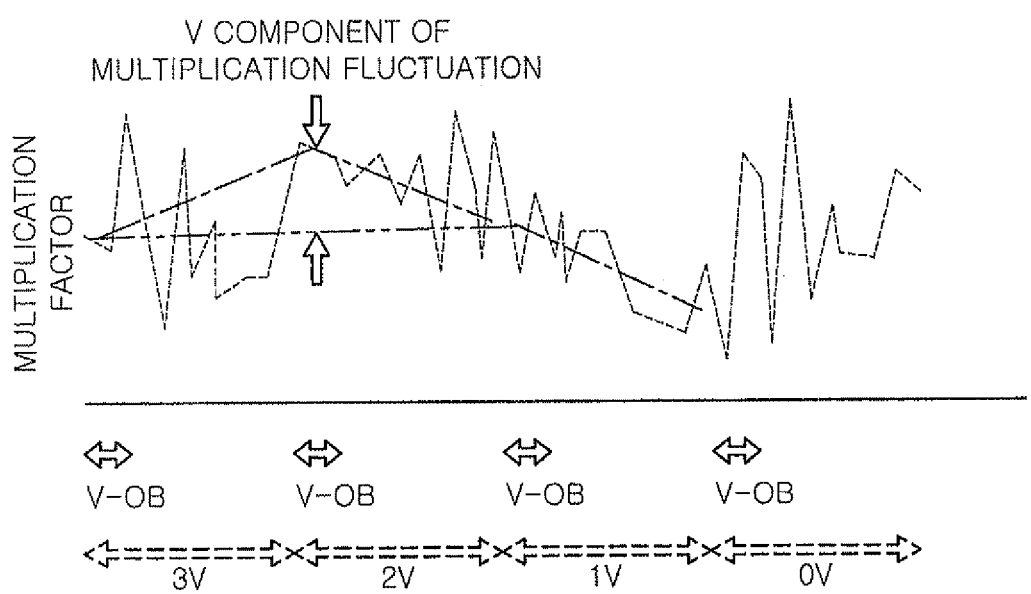
FIG. 4B schematically shows electron multiplication fluctuations between screens in accordance with the embodiment of the present invention.

FIG. 4A schematically shows outputs of an EM-CCD which indicate an example of signal values of upward, downward, forward and backward sides containing electron multiplication fluctuations and thermal noises in accordance with the embodiment of the image pickup method and the image pickup apparatus of the present invention. FIG. 4B schematically shows an output of an EM-CCD which indicates an example of a signal value containing electron multiplication fluctuations and thermal noises in accordance with the embodiment of the image pickup method and the image pickup apparatus of the present invention. FIG. 4C shows equations (equations 1, 2, and 3) for calculating electron multiplication fluctuations between screens in the image pickup method and the image pickup apparatus of the present invention.

Figure 5A:
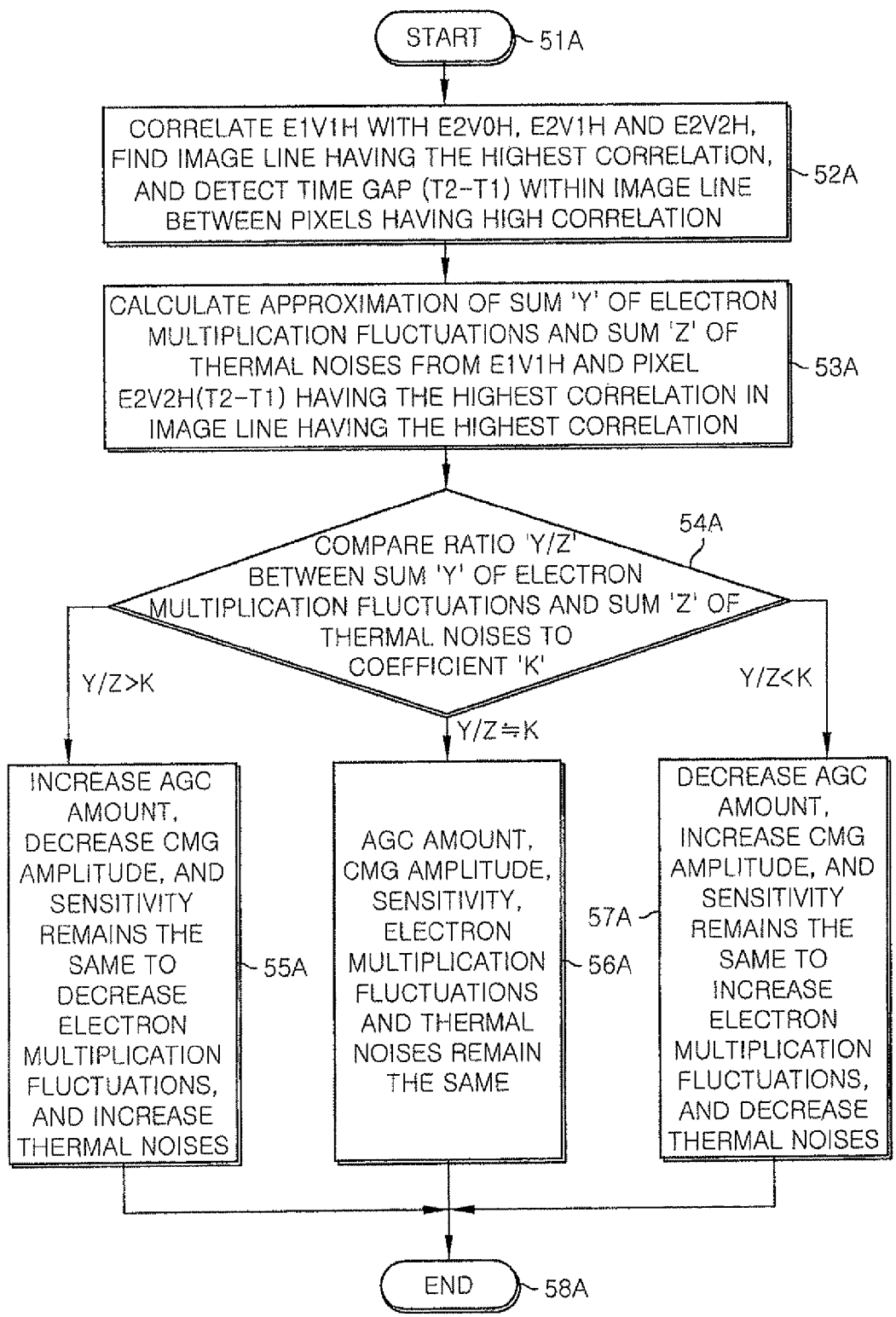
FIG. 5A is a flowchart showing a process for determining a ratio between a sum of electron multiplication fluctuations and a sum of thermal noises in accordance with the embodiment of the present invention.
Figure 5B:
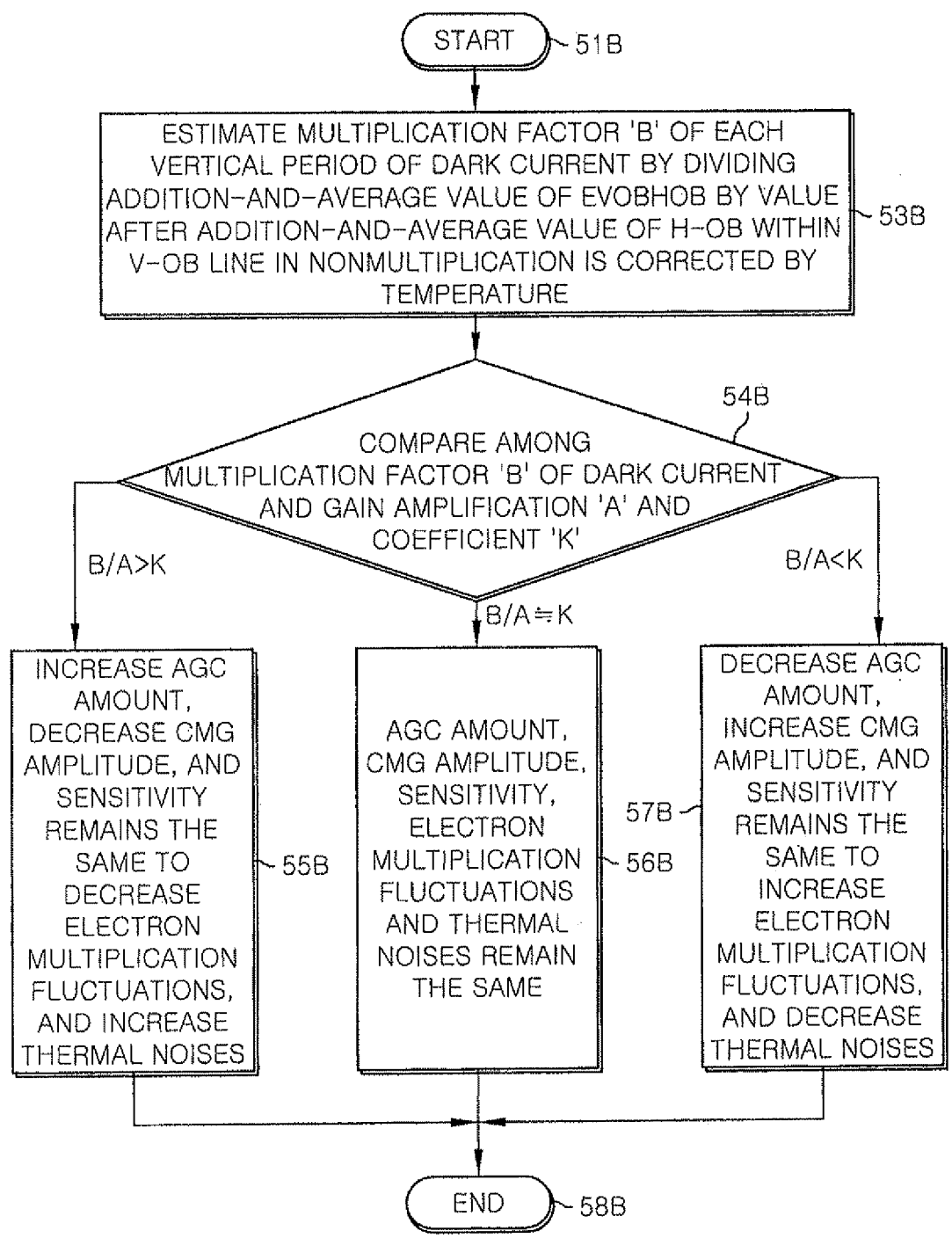
FIG. 5B is a flowchart showing a process for determining a ratio between electron multiplication factor and gain amplification factor in accordance with the embodiment of the present invention.
Figure 5D:
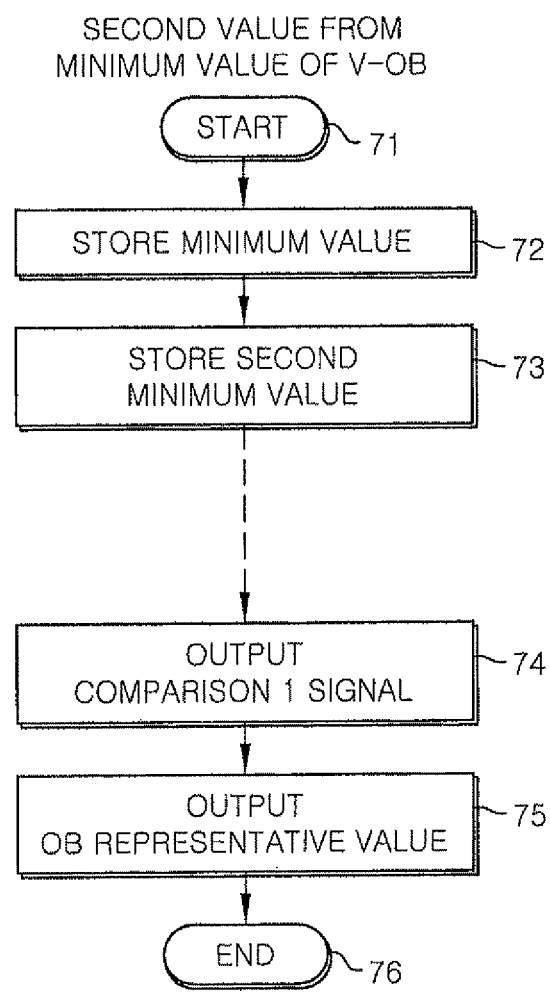
FIG. 5D is a flowchart showing a process for detecting as a representative value a second value from a minimum value of V-OB in accordance with the embodiment of the present invention.

FIG. 5A is a flowchart showing a process for determining a ratio between a sum of electron multiplication fluctuations and a sum of thermal noises in accordance with the embodiment of the image pickup method and the image pickup apparatus of the present invention. FIG. 5B is a flowchart showing a process for determining a ratio between electron multiplication factor and gain amplification factor in accordance with the embodiment of the image pickup method and the image pickup apparatus of the present invention. FIG. 5C is a flowchart showing a process for detecting as a representative value a second value from a minimum value of vertical pixels of V-OB (Vertical-Optical Black) in accordance with the embodiment of the image pickup method and the image pickup apparatus of the present invention. FIG. 5D is a flowchart showing a process for detecting as a representative value a second value from a minimum value of V-OB in accordance with the embodiment of the image pickup method and the image pickup apparatus of the present invention.

Further, FIGS. 2A and 2B show block diagrams of inner configurations of the image signal processing unit for performing the detecting operation of the multiplication unevenness including high band component detection.

Vertical axes in FIGS. 4A and 4B are image signal amounts, horizontal axis in FIG. 4A is a horizontal pixel (equivalent to a horizontal scan time), and a horizontal axis in FIG. 4B is a vertical pixel (equivalent to a vertical scan time). In FIG. 4A, (a) is a previous screen image (2V), (b) is a present screen image (1V), and (c) is a subsequent screen image (0V). Also, in each of (a), (b) and (c) in FIG. 4A, an upper end is a previous scanning line (2H), a middle end is a present scanning line (1H), and a lower end is a subsequent scanning line (0H). The three screen images of (a), (b), and (c) in FIG. 4A are accumulated in a memory. In FIG. 4A, the present screen image (1V) is a screen image before a vertical period with the previous screen image (2V) and a screen image after the vertical period with the subsequent screen image (0V).

The vertical direction is the previous scanning line (2H) and the subsequent scanning line (0H) with respect to the present scanning line (1H). Broken lines are random noise, and solid lines are effective signal components obtained by averaging random noise. A case in which effective signal components obtained by averaging random noises of the solid lines are similar is marked 'correlated'.

FIG. 4B is a schematic view of detecting a vertical component of multiplication fluctuation of the embodiment 1.

In FIGS. 4A, 4B, 4C, and 5A, in an approximate calculation of the total Y=Y1+Y2 of the electron multiplication fluctuations, a dark current of the effective pixels whose multiplication part has been corrected is subtracted.

Also, in order to further reduce the influence of thermal noise, a non-recursive averaging calculation is performed by using equations 1 and 2 shown below.

Further, E2V2H indicates an image signal of a scanning line of a previous screen image, E2V1H indicates an image signal of a present scanning line of the previous screen image, and E2V0H indicates an image signal of a subsequent scanning line of the previous screen image.

Also, E1V2H indicates an image signal of a previous scanning line of the present screen image, E12V1H indicates an image signal of a present scanning line of the present screen image, and E1V0H indicates an image signal of a subsequent scanning line of the present screen image. And, E0V2H indicates an image signal of a previous scanning line of a subsequent screen image, E0V1H indicates an image signal of a present scanning line of the subsequent screen image, and E0V0H indicates an image signal of a subsequent scanning line of the subsequent screen image.

$$Y1 = \sum_{t=t2-t1}^{n-t2+t1} \frac{\left\{\frac{E2V2H(t-1+t2-t1) + E2V2H(t+t2-t1) + E2V2H(t+1+t2-t1)}{E1V1H(t-1) + E1V1H(t) + E1V1H(t+1)}\right\}^2}{((n-t1+t2))} \quad \text{Equation 1}$$

-continued $$Y2 = \sum_{t=t2-t1}^{n-t2+t1} \frac{\left\{\begin{array}{l} E2V2H(t-1+t2-t1) + E2V2H(t+t2-t1) + \\ E2V2H(t+1+t2-t1) - \\ E1V1H(t-1) - E1V1H(t) - E1V1H(t+1) \end{array}\right\}^2 n}{n-t1+t2}$$

Equation 2

In this manner, the dark current noise is approximated to the total Y1 of the square of the ratio between screen images of horizontal non-recursive averages of highly correlated pixels and the total Y2 of the square of the difference between screen images of horizontal non-recursive averages of highly correlated pixels.

In FIGS. 3A, 4A, and 5A, since the dark current of the effective pixels whose multiplication part has been corrected is subtracted in the approximate calculation of the total Z of thermal noises, a non-recursive averaging is not required.

Namely, since it is the accumulation of the square of the difference between screen images of the highly correlated pixels, either the non-recursive averaging or recursive averaging attenuates any of the horizontal, vertical, inter-screen high frequency components. Thus, the non-recursive averaging is not necessary.

$$Z = \sum_{t=t2-t1}^{n-t2+t1} \{E2V2H(t+t2-t1) + E1V1H(t)\}^2 n/(n-t1+t2)$$

Equation 3

In this manner, the thermal noise is approximated to the total Z of the square of the difference between the screen images of the highly correlated pixels.

The flow chart of FIG. 5A shows a process for determining a ratio between the total Y=Y1+Y2 of electron multiplication fluctuations and the total Z of thermal noises in an image signal processing unit.

Referring to FIG. 5A, an image signal E1V2H of an image line of the present screen is correlated with image signals E2V0H, E2V1H, and E2V2H of an image line of the previous screen (before vertical period), an image line having the highest correlation (in FIG. 4A, E2V2H has the highest correlation with E1V2H) is found, and a time gap (t2-t1) in image lines between pixels having a high correlation is measured.

Next, the total Y=Y1+Y2 of the electron multiplication fluctuations and the total Z of thermal noises is calculated, between t2-t1, in regard to the image line E1V1H and the pixel E2V2H having the highest correlation within the image line having the highest correlation. And, a ratio Y/Z of the total Y=Y1+Y2 of the electron multiplication fluctuations and the total Z of thermal noises is compared to a coefficient K.

When the relation is Y/Z>K, an average variable amount of AGC (AGC amount) above a vertical period is increased, an average CMG amplitude above the vertical period is reduced, and an average sensitivity above the vertical period remains as it is, thereby reducing the total Y of the electron multiplication fluctuations and increasing the total Z of the thermal noises.

When Y/Z≈k, the average AGC amount above the vertical period remains as it is, the average CMG amplitude above the vertical period remains as it is, the average sensitivity above the vertical period remains as it is, so that the total Y of the electron multiplication fluctuations remains as it is and the total Z of the thermal noise remains as it is.

When Y/Z<K, the average AGC amount above the vertical period is reduced, the average CMG amplitude above the vertical period is increased, and the average sensitivity above the vertical period remains as it is, thereby increasing the total Y of the electron multiplication fluctuations and reducing the total Z of the thermal noises.

Next, in the image processing unit, a value obtained by adding H-OB (Horizontal Optical Black) in a V-OB (vertical Optical black) line and averaging the added values or a minimum value of H-OB in the V-OB line is determined as a representative value of a dark current of H-OB in the V-OB line. There is no vertical smear component and horizontal smear component in the H-OB in the V-OB line. Accordingly, when the representative value of the H-OB in the present V-OB line is divided by a value obtained by temperature-correcting a representative value of H-OB in the V-OB line stored when non-electron multiplication was performed, an multiplication factor of the dark current of the V-OB at each vertical period can be detected and a multiplication factor of each vertical period can be estimated by an approximate calculation.

The difference between the estimated multiplication factor of the dark current and an average of the estimated multiplication factors of dark currents of the previous and subsequent vertical periods is the fluctuation component of the multiplication factor of the vertical period. The fluctuation component of the multiplication factor of the vertical period can be removed by reducing the AGC amount proportionally to the difference between the multiplication factor of the present dark current and the average of the multiplication factors of dark currents of the previous and subsequent vertical periods.

On the other hand, the thermal noise is proportional to the gain. Accordingly, the multiplication factor B of the dark current and the gain amplification factor A are estimated unambiguously.

FIG. 5B is a flow chart showing a determination of the ratio between the electron multiplication factor and the gain amplification factor A. Referring to FIG. 5B, the multiplication factor B of each vertical period of the dark current is estimated by dividing the representative value of the dark current of H-OB in the present V-OB line by the value obtained by temperature-correcting the representative value of the dark current of H-OB in the V-OB line stored when the non-electron multiplication was performed.

Next, the ratio between the multiplication factor B of each vertical period of the dark current and the gain amplification factor A is compared to the coefficient K.

When the relation is B/A>K, the average AGC amount above the vertical period is increased, the average CMG amplitude above the vertical period is reduced, and the average sensitivity above the vertical period remains as it is, thereby reducing the total Y of the electron multiplication fluctuations and increasing the total Z of the thermal noises.

When B/A≈k, the average AGC amount above the vertical period, the average CMG amplitude above the vertical period, the average sensitivity above the vertical period remain as they are, so that the total Y of the electron multiplication fluctuations and the total Z of the thermal noises remain as they are.

When B/A<K, the average AGC amount above the vertical period is reduced, the average CMG amplitude above the vertical period is increased, the average sensitivity above the vertical period remains as it is, thereby increasing the total Y of the electron multiplication fluctuations and reducing the total Z of the thermal noises.

Next, FIG. 1A which shows the entire configuration of an image pickup apparatus in accordance with an embodiment of the present invention will be described.

FIG. 1A is a view illustrating the overall configuration of an image pickup apparatus using a CCD image pickup device including a color separation filter.

In FIG. 1A, reference numeral 1 denotes an image pick-up apparatus, reference numeral 2 denotes an optical system such as a lens or the like for forming an image with incident light, reference numeral 3 denotes a CCD image pickup device for converting light incident from the optical system 2 into an electrical signal, reference numeral 4 denotes an FEP, reference numeral 5 denotes an image signal processing unit including a multiplication detection processing unit, and reference numeral 6 denotes a CPU (Central Processing Unit) for controlling each unit in the image pickup apparatus 1. Reference numeral 13 denotes a vertical transfer driving unit including a timing generator (TG), reference numeral 15 denotes a CMG driving unit for executing gain controlling of electron multiplication, reference numeral 8 denotes a temperature sensor, and reference numeral 17 denotes a cooling unit.

Also, the CCD image pickup device 3 is a CCD image pickup device including a color separation filter, which is, for example, an EM-CCD. The FEP 4 includes at least a CDS 401 for canceling noise from a signal outputted from the CCD image pickup device 3, an AGC unit 402 for adjusting the gain by correcting a dark current in an output signal from the CDS 401, and an ADC 403, a TG 404, a memory unit 405, D. AGC unit 406, and a DAC unit 407 in which a signal processing gray level for converting an output signal from the AGC unit 402 into a digital image signal Vi is 14-bit or greater. Further, in FIGS. 1A and 1B, the memory unit 405, the D. AGC unit 406, and the DAC unit 407 are not shown. In addition, TG 404 is a signal generator for outputting a horizontal transfer driving signal to the CCD image pickup device 3 and outputting a timing signal to the CDS 401, the AGC unit 402, and the ADC 403 of the FEP 4.

Also, in FIG. 1A (FIG. 1B), the vertical transfer driving unit 13 (13') outputs a reading and vertical transfer driving timing signal, and outputs it to a vertical transfer unit of each of the CCD image pickup device 3 (3', 7, 9).

Also, the cooling unit 17 includes a Peltier element for cooling the CCD image pickup device 3, a Peltier element driving circuit, a heat releasing fin, a fan, and a fan driving circuit (not shown). The cooling unit 17 cools the CCD image pickup device 3 depending on the temperature detected by the temperature sensor 8, and adjusts the temperature of the CCD image pickup device 3 under the control of the CPU 6. Further, in FIG. 1B, the cooling unit and the temperature 8 are omitted, rather than being shown.

Also, the image signal processing unit 5 performs various image processing on the digital image signal Vi, and converts it into a composite image signal (Video Burst Sync: VBS) of an NTSC (National Television System Committee) scheme or a PAL (Phase Alternating by Line) scheme or an SDI (Serial Digital Interface) image signal or an image signal of a certain scheme such as SDI of HDTV (HD-SDI) or the like, and outputting the same.

In FIG. 1A, the CCD image pickup device 3 such as the EM-CCD or the like of the image pickup apparatus 1 photo-electrically converts incident light formed on a light receiving face in the optical system 2 by a photo diode to generate a signal charge, electron-multiplies the signal charge while vertically transmitting and then horizontally transmitting it, and output the same to the FEP 4. The FEP 4 reduces noise from a signal outputted from the CCD image pickup device 3 to correct a dark current component, amplifies the corrected signal, converts it into a digital image signal Vi, and outputs the converted digital image signal Vi to the image signal processing unit 5. In the image signal processing unit 5, the digital image signal Vi is transmitted to the detection unit 18 and also transmitted to the subtractor 19 to execute signal processing to be described later (see FIG. 2A or 2B).

In FIG. 3A, in the detection unit 18, comparison units 41 and 42 compare the digital image signal Vi at every vertical pixel signal of the V-OB line and store the vertical pixel signals, starting from a smallest one, in line memories 43 and 44, and an OB representative value signal including a vertical (V) smear is detected. Comparison units 55 and 56 compare the OB representative value signal including the V smear and calculate a V smear from the difference between a maximum value including the V smear and a minimum value not including the V smear.

Also, in FIG. 3A, a dark current multiplication amount can be calculated by dividing a value, which is obtained by averaging H-OB signals of the V-OB lines in the event of non-electron multiplication at a reference temperature by a value obtained by temperature-correcting a value stored in a reference memory unit 48 by the D. AGC unit 50. And, a dark current of the difference between the effective pixels and the V-OB can be obtained by subtracting the value, which is obtained by averaging the H-OB signals of the V-OB lines in the event of the non-electron multiplication at the reference temperature and storing it in the reference memory unit 48, from the dark current of the effective pixels in the event of the non-electron multiplication at the reference temperature, and multiplying the dark current multiplication amount to the resultant value stored in a screen memory unit 49 by a multiplier 52, and the sum of the dark current of the respective effective pixels and the V smear can be calculated by adding the calculated value and the OB representative value including the V smear by an adder 45, and the dark current of the respective effective pixels and the V smear can be corrected by subtracting the sum from the digital image signal Vi by a subtractor 19, and an ineffective signal, namely, noise can be reduced to improve an effective sensitivity.

Further, in the image pickup apparatus in accordance with one embodiment of the present invention of FIG. 1B, a color separation optical system and three CCD image pickup devices are used, and under the condition that the image pickup apparatus of FIG. 1A uses one CCD image pickup device 3 and one FEP 4, incident light made incident to the image pickup apparatus through the lens system 2 is color-separated into three primary colors (or their complementary colors) of R (red), G (green), B (blue) or the like by using a color separation optical system 2' for example, and CCD image pickup devices 3', 7, and 9 and FEPs 4', 10, and 12 are used for the separated three colors, respectively. In this case, an image signal processing unit 5' (including multiplication unevenness detection processing) synthesizes the three colors in a certain ratio and then performs the same processing as that of the image signal processing unit 5 of FIG. 1A (detailed description thereof is omitted).

Also, the image signal processing unit in accordance with one embodiment of the present invention of FIG. 2B uses the color separation optical system and three CCD image pickup devices as shown in FIG. 1B, and an image signal Vi (e.g., RVi, GVi, BVi) is inputted to the image processing unit of FIG. 1B from the FEP unit 4', 10, and 12 for every color separated to the three primary colors (or their complementary colors) of R (red), G (green), B (blue) or the like for example, so three signals are output for each color from the image memory unit 32' and the correlation detection unit 33' (detailed description is omitted).

FIG. 2A is a block diagram showing an internal configuration of an image signal processing unit including a multiplication unevenness detection when the CCD image pickup device including the color separation filter is used in accordance with one embodiment of the present invention. Reference numeral 18 denotes a multiplication unevenness detection unit, reference numeral 19 denotes a subtractor, reference numeral 22 denotes a differentiating unit, reference numeral 23 denotes an LPF (Low Pass Filter), reference numerals 24 and 25 are square units, reference numerals 26 and 27 are accumulation units, reference numeral denotes a coefficient part comparison unit, reference numeral 30 denotes a digital AGC (D. AGC) unit, reference numeral 31 denotes an image signal processing unit including a color separation function, reference numeral 32 denotes an image memory unit including line memories and field memories, reference numeral 33 denotes a correlation detection unit, and reference numeral 34 denotes an output circuit including an SDI conversion function. Also, reference numeral 6 denotes a CPU for controlling each unit in the image pickup apparatus 1 (see FIG. 1A). The D. AGC unit 30 adjusts the amplification degree of an OB (Optical Black) representative value signal of the D. AGC unit itself according to the amplification degree of the AGC unit of the FEP. Also, the OB representative value signal is a smear component signal including a dark current of V-OB.

Next, the operation of one embodiment of the present invention will be described with reference to FIGS. 1A and 2A. The CCD image pickup device 3 of the image pickup apparatus 1 photoelectrically converts incident light formed on a light receiving face in the optical system 2 by a photo diode to generate a signal charge, electron-multiplies the signal charge while horizontally transmitting it after vertically transmitting it, and outputs the electron-multiplied signal to the FEP 4. The FEP 4 reduces noise from the signal outputted from the CCD image pickup device 3, corrects a dark current component, converts the corrected signal into an amplified signal (digital image signal Vi), and outputs it to the image signal processing unit 5.

Also, the vertical transfer driving unit (w/TG) 13 and the CMG driving unit 15 output a signal for driving the CCD image pickup device 3 to the CCD image pickup device 3 in response to a control signal outputted from the CPU 6. The CCD image pickup device 3 reads a charge from the photo diode with respect to the corresponding input signal and outputs it to the CMG unit. The CMG unit horizontally transmits and outputs the input charge to the voltage conversion unit. The voltage conversion unit converts the input charge into a voltage having a gray level of 14-bit or greater and outputs it to the FEP 4. Namely, the FEP 4 performs signal processing on the gray level of 14-bit or greater to attenuate 1/f noise other than a fluctuation among fluctuation elements of electron multiplication factor and determine it as a detection amount highly correlated to the total of fluctuation. And then, the detection amount highly correlated to the total of the fluctuation is compared to a detection amount highly correlated to the total of the sum of the fluctuation and thermal noise, and thereby an intra-screen average value of a variable gain amplification is controlled to be high and an electron-multiplying electrode amplitude value (CMG amplitude voltage) is controlled to be low such that the total of 1/f noise of the fluctuation and the total of thermal noises become equal. By controlling so, an image signal level has a certain level.

An embodiment of a function of detecting a dark current multiplication amount of the present invention will now be described with reference to FIGS. 3A to 3E. FIGS. 3A to 3E are block diagrams showing an internal configuration of a detection unit for detecting a representative value of an OB including detection of a dark current, a smear, and a multiplication unevenness in accordance with one embodiment of the present invention. Reference numerals 18A, 18B, 18C, 18D, and 18E denote detection units, reference numerals 19, 46, and 57 denote subtractors, reference numerals 45, 59, and 63 denote adders, reference numerals 51 and 58 denote dividers, reference numeral 52 denotes a multiplier, reference numerals 47, 68, and 69 denote averaging units, reference numerals 43 and 44 denote line memory units, reference numerals 48 and 60 denote reference memory units, reference numerals 41, 42, 53, 54, 55, and 56 denote comparison units, and reference numeral 49 denotes an image memory unit.

An operation of detecting and correcting a vertical smear signal will now be described with reference to FIGS. 3A to 3E and 5C and 5D.

First, the embodiment will be described with reference to FIGS. 3A and 5C. CPU 6 shown in FIGS. 1A and 15 sets an upper limit value of a minimum signal and an upper limit value of a second minimum signal in the line memory unit 44 and 43, respectively. Here, as the upper limit values, for example, values obtained by digitizing the luminance of the signals may be used (respective values to be mentioned below are digitized based on the same reference).

The comparison unit 42 compares the upper limit value stored in the line memory unit 44 and a value of a pixel of an image signal of a first line (hereinafter, V-OB1) of the V-OB area between respective pixels, and stores the signal having a smaller value (image signal of V-OB1) as the minimum signal of each pixel in the line memory unit 44 (steps 61 and 62).

The comparison unit 42 compares a value of a pixel of an image signal of V-OB2 and the value of the minimum signal in the line memory unit 44 between respective pixels and stores the signal having a smaller value as the minimum signal of each pixel in the line memory unit 44. The signal having a greater value is transmitted to the comparison unit 41. The comparison unit 41 compares the value of the greater signal and the upper limit value stored in the line memory unit 43 as the second minimum signal between respective pixels and stores a signal having a smaller value as the second minimum signal of each pixel in the line memory unit 43 (step 63).

Similarly, the comparison unit 42 compares a value of a pixel of an image signal of V-OBN of Nth line (where N is a natural number of 3 or greater) and a minimum value of the memory unit 44 between respective pixels and stores the signal having a smaller value as the minimum signal of each pixel in the line memory unit 44. A signal having a greater value is transmitted as a signal of comparison 1 of each pixel to the comparison unit 41 (step 64).

The comparison unit 41 compares the value of the second minimum signal and the value of comparison 1 signal between respective pixels, and stores the signal having a smaller value as the second minimum signal (comparison 2 signal) of each pixel in the line memory unit 43 (step 65). When the comparison unit 42 terminates the comparison of the last V-OB, the line memory unit 43 outputs the second minimum signal as an OB representative signal for a smear correction (step 66) and the representative value detection is terminated (step 67).

An average multiplication amount of dark current in a screen or an average multiplication amount of dark current between screens is calculated, using a recursive average of the averaging unit 68, from a multiplication amount of dark current in a vertical period or an average multiplication amount of dark current in a screen, and the average multiplication amount of dark current between screens is calculated using a recursive average of the averaging unit 69 to be outputted to CPU 6 shown in FIGS. 1A and 1B.

An embodiment illustrated in FIGS. 3B and 5D will now be described. The difference between FIGS. 3B and 3A is that comparison units 53 and 54 are provided instead of the averaging unit 47. A description of the operation of the same parts as those in FIG. 3A will be omitted and the operations of the comparison units 53 and 54 will be described. The CPU 6 resets an upper limit value of a minimum value signal in the comparison units 53 and 54. Here, the upper limit value of the comparison units 53 and may use, for example, a value obtained by digitizing luminance of a signal (each value described below is also digitized value based on the same reference). The comparison unit 54 compares the reset upper limit value with a value of a pixel of an image signal of a first line (hereinafter, referred to as V-OB1) of a V-OB area between pixels, and sets a signal having a smaller value (a signal of a minimum value of V-OB1) as a signal of a minimum value of each pixel in the comparison unit 54 (steps 72 and 72). The comparison unit 54 compares a pixel value of a pixel of an image signal of a V-OB2 with a resultant value of a signal of a minimum value of the comparison unit 54 between pixels, and stores a signal having a smaller value as a signal of a minimum value of each pixel. The signal having a greater value is transmitted to the comparison unit 53. The comparison unit 53 compares the greater value of the signal and the upper limit value reset in the comparison unit 53 as a second smallest value between the pixels, and stores the signal having a smaller value as the second smallest signal of each pixel in the comparison unit 53 (step 73). Similarly, the comparison unit 54 compares a value of a pixel of an image signal of an Nth V-OBN (where N is a natural number of 3 or greater) and a minimum value of the comparison unit 54 between pixels, and stores a signal having a smaller value as a signal having a minimum value of each pixel in the comparison unit 54. The signal having a greater value is transmitted to the comparison unit 53 as a signal of comparison 1 of each pixel (step 74). The comparison unit 53 compares the value of the second smaller signal and the value of the signal of comparison 1 between pixels and stores the signal having a smaller value as the second smaller signal of each pixel in the comparison unit (step 75). When the comparison unit 54 terminates the comparison processing of the last V-OB, the comparison unit outputs the second smallest signal as an OB representative value signal for a dark current measurement (step 26) and terminates the representative value detection processing (step 27).

Figure 3C:
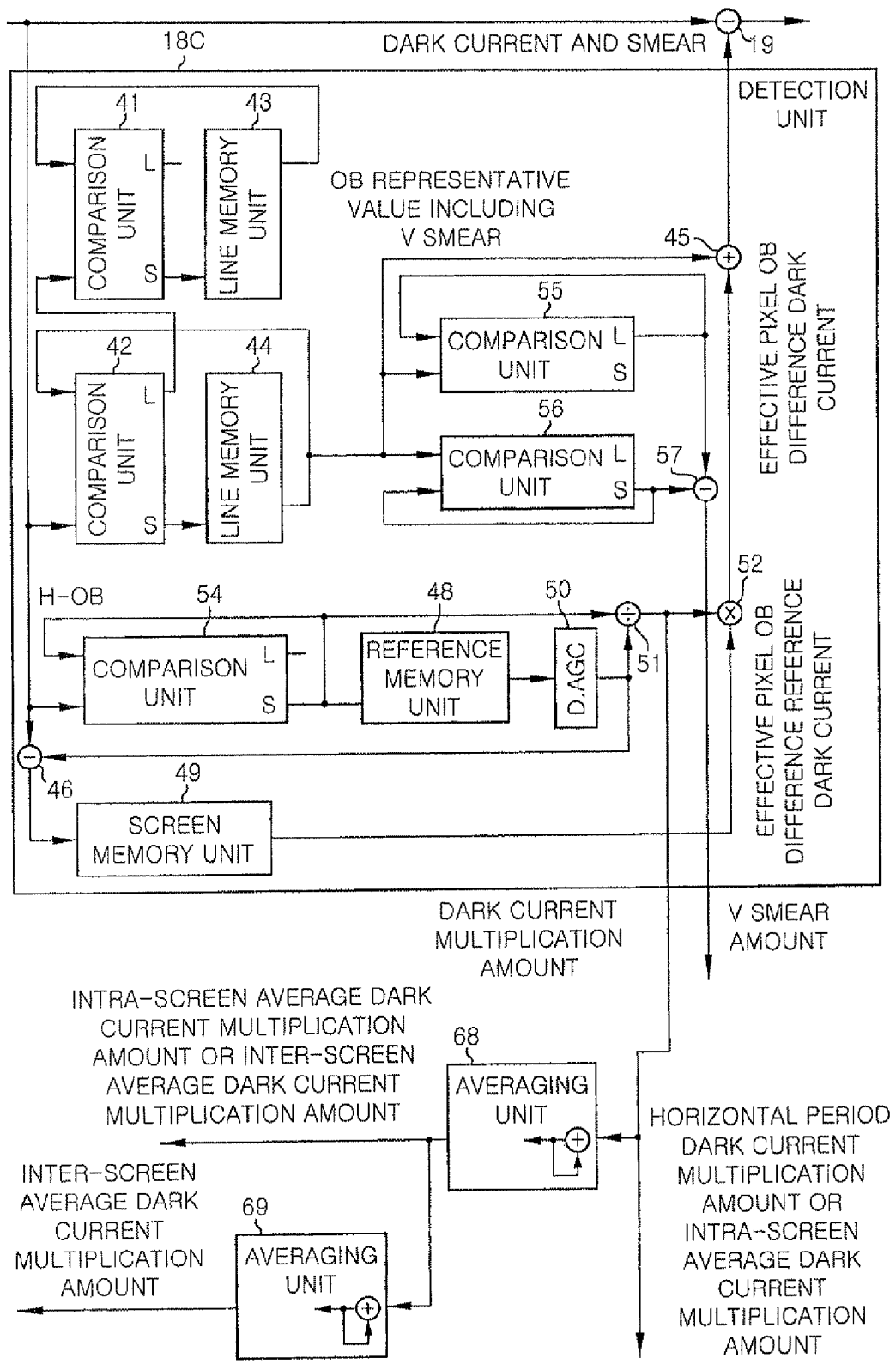
FIG. 3C is a block diagram showing an inner configuration of a detection unit for detecting not only a dark current, a smear and a multiplication unevenness but also a representative value of OB in accordance with the embodiment of the present invention.

Next, an embodiment illustrated in FIG. 3C will be described. The difference between FIG. 3C and FIG. 3B is that the comparison unit 53 is omitted and the comparison unit 54 outputs a minimum value as an OB representative value signal for a dark current measurement. Thus, a description of a detailed operation will be omitted.

Figure 3D:
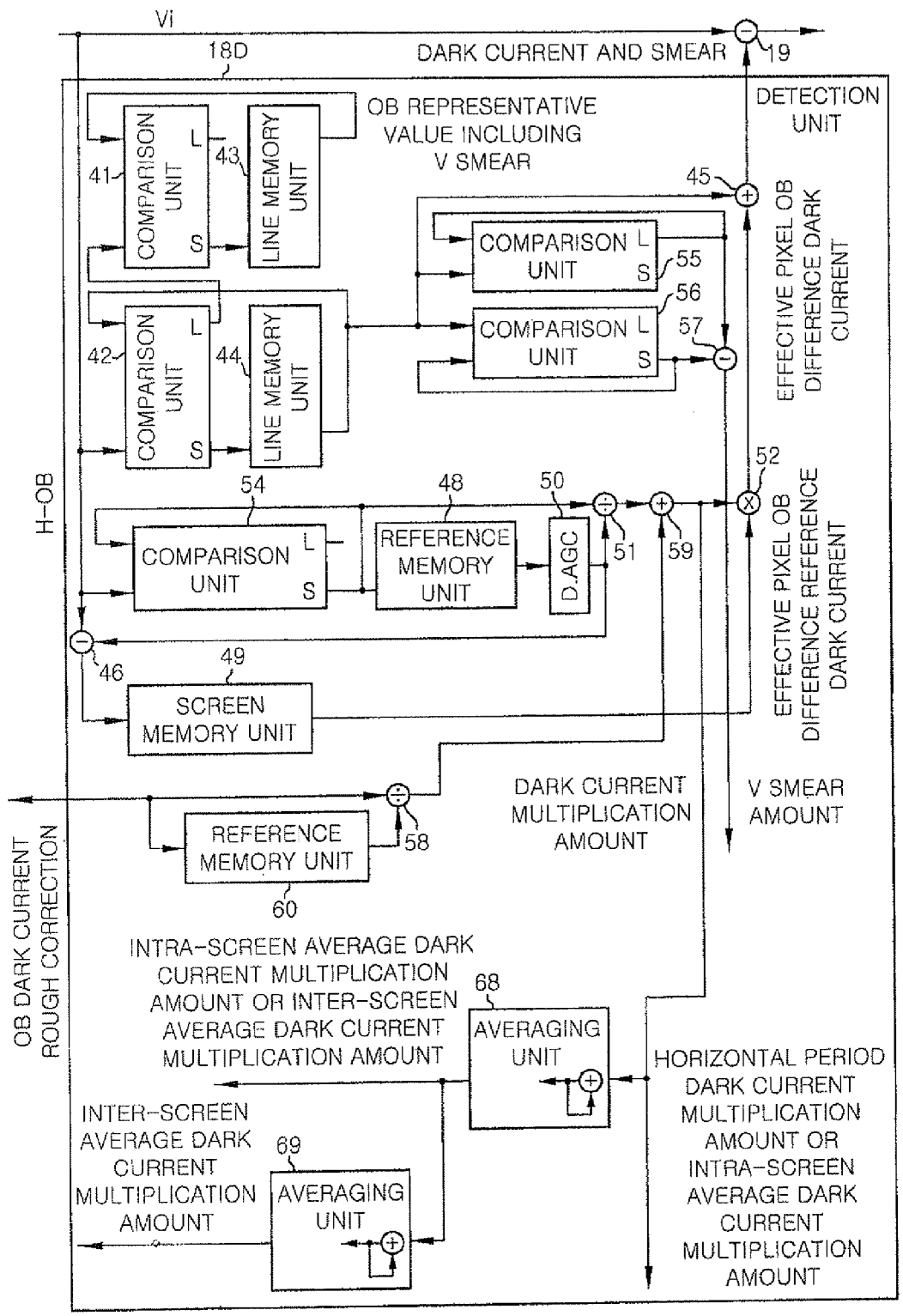
FIG. 3D is a block diagram showing an inner configuration of a detection unit for detecting not only a dark current, a smear and a multiplication unevenness but also a representative value of OB in accordance with the embodiment of the present invention.

Next, an embodiment illustrated in FIG. 3D will be described. The difference between FIG. 3D and FIG. 3C is that an OB dark current temporary correction of FEP 4 is used, and the reference memory unit 60, the subtractor 58 and the adder 59 are added, and the bit number (gray level) of the FEP 4 is reduced. Thus, a detailed description will be omitted.

In FIGS. 1A and 1B, the CPU 6 controls the vertical transfer driving unit (w/TG) 13 to control an accumulation time. In addition, the CPU 6 controls the elements 4, 10, and 12 to control a variable gain amplification. Also, the CPU 6 controls the image signal processing unit 5 including multiplication detection, controls variable gain amplification of a dark current component of an effective pixel signal, and subtracts it from an effective pixel signal.

Further, a vertical smear or a horizontal smear is little mixed in a dark current or a white blemish component of the H-OB (parts) of the V-OB. This is used and as shown in the detection unit 45 of FIG. 3A, a multiplication amount of a dark current depending on the temperature and electron multiplication can be estimated in real time by comparing it with a signal of a reference memory unit which is stored after adding and averaging signals of the H-OB (parts) of the V-OB of the EM-CCD in the non-electron multiplication state at a reference temperature.

In a different method, the fact that a minimum value of vertical and horizontal pixel levels of the V-OB is a dark current component in which a vertical smear or a horizontal smear is little mixed is used.

Namely, as shown in the detection unit 45 of FIG. 3B, a multiplication amount of a dark current depending on the temperature and electron multiplication can be estimated in real time by detecting a vertical and horizontal minimum value of V-OB and comparing it with a signal of a reference memory unit which is stored after adding and averaging a signal of vertical and horizontal minimum value of the V-OB of the EM-CCD in a non-electron multiplication state at a reference temperature. Thus, after a dark current is outputted from the screen effective pixels stored in the screen memory unit 49, the multiplication amount of the dark current depending on the temperature and the electron multiplication may be multiplied to the effective pixel OB difference reference dark current signal obtained by subtracting an addition-and-average value of the signal of the H-OB (parts) of the V-OB to estimate a dark current of the screen effective pixels of the difference with the OB.

Namely, in an image pickup method of a solid image pickup apparatus which uses a 14-bit or greater FEP and has an EM-CCDD image pickup device having a temperature measurement unit and the V-OB, the variable voltage electron multiplying electrode driving unit, the variable gain amplification unit, the line memory, and the screen memory, the ratio between a current representative value of a dark current of the V-OB and an assumption value of a dark current obtained by correcting a dark current of V-OB stored when non-electron multiplication was performed with an image pickup device measurement temperature (an estimate value of an electron magnification rate of each vertical period) is multiplied to a dark current based on each effective pixel of the screen memory stored when the non-electron multiplication was performed, and the multiplication value is subtracted from an effective pixel signal. As a result, a dark current unevenness of an interdigital type fixed noise of a dark portion on the screen conspicuous even to the naked eyes is subtracted, so the inter-screen fluctuation of the dark current of the main ingredient of the 1/f noise of the electron-multiplication fluctuation is subtracted. Thus, the dark current, white blemish, or the vertical smear component of the V-OB and the dark current or the blemish component of the screen effective pixel of the difference with the OB are subtracted and only an image signal of a screen effective pixel can be calculated.

When it is multiplied to an average dark current of the effective pixel stored when the non-electron multiplication was performed, rather than to the dark current based on each effective pixel stored when the non-electron multiplication was performed, and then it is subtracted from the effective pixel signal, the dark current unevenness of fixed noise cannot be subtracted, but the amount of the screen memory can be reduced.

Thus, it can be applicable to a case of using both two types of noise reducing method of a fixed noise reducing method among any of (1) averaging an image signal of a certain level or lower in a scanning line within a horizontal period one-dimensionally, (2) averaging an image signal of a certain level or lower in a screen within a horizontal period two-dimensionally, and (3) averaging an image signal of a certain level or lower between screens within a vertical period three-dimensionally, and a random noise reducing method such as detecting a correlation and a motion vector between screen vertical periods of an image signal and averaging portions having a high correlation of an image signal having a correlation of a certain level or higher and a motion vector of a certain level or lower.

In addition, when there is no high luminance image signal, a horizontal smear is small, so a signal in which an average of the H-OB part is a 1/f noise component of a dark current is used, image signals of a certain level or lower in a scanning line without a high luminance image signal are averaged within the scanning line and a fluctuation portion between scanning lines of the average of the H-OB part is subtracted, thus reducing the amount of the line memory of the average in the screen.

Further, although there are a high luminance image signal and a horizontal smear, the fluctuation portion between the scanning lines of the average of the H-OB part can be subtracted by using the fact that the average of the H-OB part is the sum of the horizontal smear component common in the image signal in the scanning line in which the high luminance image signal is present and the 1/f noise component, to attenuate the horizontal smear component and the 1/f noise component of the dark current and reduce the amount of the line memories of the average in the screen.

Next, the processes of detecting a second minimum signal between vertical pixels and detecting an OB representative value for the smear correction will be described with reference to FIGS. 2A, 3A and 5C.

In FIGS. 2A and 3A, CPU 6 shown in FIGS. 1A and 1B sets an upper limit value of a minimum signal and an upper limit value of a second minimum signal in the line memory unit 44 and 43, respectively. Here, as the upper limit values, for example, values obtained by digitizing the luminance of the signals may be used (respective values to be mentioned below are digitized based on the same reference).

The comparison unit 42 compares the upper limit value stored in the line memory unit 44 and a value of a pixel of an image signal of a first line (hereinafter, V-OB1) of the V-OB area between respective pixels, and stores the signal having a smaller value (image signal of V-OB1) as a minimum signal of each pixel in the line memory unit 44 (steps 61 and 62).

The comparison unit 42 compares a value of a pixel of an image signal of V-OB2 and the value of the minimum signal in the line memory unit 44 between respective pixels and stores the signal having a smaller value as the minimum signal of each pixel in the line memory unit 44. The signal having a greater value is transmitted to the comparison unit 41. The comparison unit 41 compares the value of the greater signal and the upper limit value stored in the line memory unit 43 as a second minimum signal between respective pixels and stores the signal having a smaller value as the second minimum signal of each pixel in the line memory unit 43 (step 63).

Similarly, the comparison unit 42 compares a value of a pixel of an image signal of V-OBN of Nth line (where N is a natural number of 3 or greater) and a minimum value of the memory unit 44 between respective pixels and stores the signal having a smaller value as the minimum signal of each pixel in the line memory unit 44. The signal having a greater value is transmitted as a comparison 1 signal of each pixel to the comparison unit 41 (step 64).

The comparison unit 41 compares the value of the second minimum signal and the value of the comparison 1 signal between respective pixels, and stores the signal having a smaller value as the second minimum signal (comparison 2 signal) of each pixel in the line memory unit 43 (step 65).

When the comparison unit 42 terminates the comparison of the last V-OB, the line memory unit 43 outputs the comparison 2 signal as an OB representative signal for a smear correction to the adder 45 (step 66) and the representative value detection is terminated (step 67).

According to the description of FIG. 3A, the OB representative signal is also inputted to the comparison unit 55, so a maximum value of the OB representative signal is calculated, and also inputted to the comparison unit 56, so a minimum value of the OB representative signal is calculated. The difference between the maximum value of the OB representative signal and the minimum value of the OB representative signal is obtained by the subtractor 57, and is outputted as a vertical smear of the V-OB to the CPU 6.

When the smear amount is equal to or greater than a predetermined reference amount, a horizontal smear leaked into the horizontal H-OB of the effective pixel is equal to or larger than the vertical smear of about −80 dB. However, a horizontal smear leaked into the H-OB (parts) of the V-OB from the vertical smear leaked into the V-OB is −160 dB, which can be negligible.

Thus, when the averaging unit 47 in FIG. 3A adds and averages the H-OB (parts) of the V-OB, and the ratio between the H-OB addition-and-average value of the reference V-OB stored in the reference memory unit 48 and the reference H-OB obtained by correcting the temperature and the amplification degree of FEP (it is called AFE (Analog Front End)) in the D. AGC unit 50 are obtained by the divider 51, a dark current multiplication amount of the vertical period can be calculated.

The H-OB addition-and-average value of the reference V-OB stored in the reference memory unit 48 and the difference in the subtractor 46 of the reference dark current of the effective pixel are stored as the effective pixel OB difference reference dark current in the screen memory unit 49, and when the stored effective pixel OB difference reference dark current is multiplied with the dark current multiplication amount by the multiplier 52, the effective pixel OB difference dark current of the vertical period can be calculated. Thereafter, the calculated effective pixel OB difference dark current is added to the OB representative value by the adder 45, and the added value is outputted to the subtractor 19.

Instead of the calculation of the addition-and-average value by the averaging unit 47 in FIG. 3A, the comparison unit 54 of FIG. 3B may be used to calculate a minimum value of the H-OB.

When the smear amount is lower than a predetermined reference amount, a horizontal smear leaked into the horizontal H-OB of the effective pixel is smaller than the vertical smear of about −80 dB, which can be negligible. Thus, when the averaging unit 47 adds and averages the horizontal H-OB of the effective pixel and the ratio between the horizontal H-OB addition-and-average value of the reference effective pixel stored in the reference memory unit 48 and the reference H-OB obtained by correcting the temperature and the amplification degree of the AFE by the D. AGC unit 50 is obtained by the divider 51, a dark current multiplication amount of the horizontal period can be obtained.

The difference in the subtractor 46 between the reference H-OB addition-and-average value stored in the reference memory unit 48 and the reference dark current of the effective pixel is stored as the effective pixel OB difference reference dark current in the screen memory unit 49, and the stored effective pixel OB difference reference dark current is multiplied with the dark current multiplication amount by the multiplier 52. As a result of the multiplication, the effective pixel OB difference dark current of the horizontal period can be calculated. Further, the calculated effective pixel OB difference dark current of the horizontal period is added to the OB representative value by the adder 45, and the added value is outputted to the subtractor 19.

Instead of the calculation of the addition-and-average value by the averaging unit 47 in FIG. 3A, the comparison unit 54 of FIG. 3C may be used, and the ratio of a minimum value of the H-OB may be obtained by calculating a minimum value of the H-OB and the dark current multiplication amount of the horizontal period may be calculated.

Similarly, the processes of detecting a second minimum signal of the V-OB and detecting an OB representative value used for calculation of dark current multiplication amount will be described with reference to FIGS. 2A, 3B, 3C and 5D.

In FIGS. 2A, 3B, 3C and 5D, CPU 6 sets an upper limit value of a minimum signal and an upper limit value of a second minimum signal in the comparison unit 53 and 54, respectively. Here, as the upper limit values, for example, values obtained by digitizing the luminance of the signals may be used. Also, respective values to be mentioned below are digitized based on the same reference.

The comparison unit 54 compares a set upper limit value and a value of each pixel of an image signal of the V-OB area and stores and sets the signal having a smaller value (image signal of V-OB) as a minimum signal of the V-OB in the line memory unit 44. And, the signal having a greater value is transmitted to the comparison unit 53 (steps 71 and 72).

The comparison unit 53 compares the value of the greater signal and the upper limit value set as the second minimum signal, and stores and sets the signal having a smaller value as the second minimum signal of the V-OB in the line memory unit 43 (step 73).

In the same manner, the comparison unit 53 compares a value of a pixel of an image signal of V-OBN of Nth line and a minimum value of the line memory unit 44 between respective pixels and stores the signal having a smaller value as the minimum signal of each pixel in the line memory unit 44. The signal having a greater value is outputted, as a comparison 1 signal of each pixel, to the comparison unit 42 (step 74).

When the comparison unit 54 terminates the comparison of the last V-OB, the comparison unit 53 outputs the second minimum signal, as an OB representative signal used for calculation of dark current multiplication amount, to the divider 51 (step 75) and the processing of the representative value detection is terminated (step 76).

In the above description with reference to FIG. 3B, the second minimum signal is detected as the representative signal. However, when the EM-CCD providing a small horizontal (H) smear and a small black blemish is used and, as shown in FIG. 3C, a minimum value is detected from the line memory 44 and set as an OB representative value including a vertical (V) smear, and the difference between a maximum value and a minimum value of the OB representative value including the V smear from the comparison unit 55 and the comparison unit 56 is detected as a V smear amount, a minimum value of the H-OB is detected by the comparison unit 54, and the dark current multiplication amount is detected from each horizontal period signal, the dark current multiplication amount is equal to the addition of the 1/f fluctuation and H smear.

Further, when the V smear proportional to the H smear is small, the fluctuations in the horizontal period of the H smear can be negligible. Thus, when the dark current and the H smear are subtracted by the subtractor 19, it is the same as a subtraction of the dark current unevenness, the V smear, H smear, and 1/f fluctuation. As a result, a noise is reduced, and an effective sensitivity is improved.

Also, an embodiment of FIG. 3D will now be described.

FIG. 3D is a view obtained by adding a divider 58, an adder 59, and a reference memory unit 60 to the configuration of FIG. 3C.

Thus, an OB dark current which is outputted from the OB memory unit 405 and the D. AGC unit 406 existing in the FEP 4 of FIG. 1A so as to be output to the CDS 401 through the DAC (Digital to Analog Converter) 407 in order to offset the CDS 401 is used as an OB dark current temporary correction, and a dark current multiplication amount of the OB dark current temporary correction is detected by the divider 58 and the reference memory unit 60.

Also, the detected dark current multiplication amount and the dark current multiplication amount of the OB dark current detailed correction detected by the divider 51 are added by the adder 59 and the added amount is called a dark current multiplication amount.

This operation itself is complicated, but for example, the FEPs 4, 4', 10, and 12 of the entire configuration of the image pickup apparatus in accordance with the present invention as shown in FIGS. 1A and 1B and the image signal gray levels (bit numbers) of the image signal processing unit 5 including a multiplication detection are minimized.

Namely, since there is no vertical smear component or horizontal smear component of a high luminance signal of an effective pixel in the H-OB of the V-OB line, a multiplication factor of each screen V-OB of a dark current can be detected by adding and averaging the H-OB in the V-OB line by the representative value of the dark current of the V-OB and dividing a value obtained by adding and averaging an H-OB in the V-OB line of the EM-CCD of the reference temperature when non-multiplication was performed and temperature-correcting it by a representative value of the dark current of the V-OB, and a multiplication factor of each vertical period can be estimated.

Or, since there is no vertical smear component or horizontal smear component of a high luminance signal of an effective pixel in the Nth value from the minimum of the V-OB, an amplification factor of each screen V-OB of a dark current can be detected by calculating the Nth value from the minimum of the V-OB by the representative value of the dark current of V-OB and dividing it by a value obtained by calculating the Nth value from the minimum of the V-OB and temperature-correcting it, and a multiplication factor of each vertical period can be estimated.

A fluctuation component of the multiplication factor of the vertical period is different from an average of each V-OB and front and rear V-OBs of a multiplication factor of the dark current estimated by dividing the value obtained by temperature-correcting the representative value of the dark current of the V-OB of the EM-CCD at a reference temperature when the non-multiplication was performed by the representative value of the dark current of the V-OB.

The fluctuation component of the multiplication factor is almost proportional to the multiplication factor. On the other hand, thermal noise is proportional to gain. Thus, briefly, when the multiplication factor almost proportional to the fluctuation component of the multiplication factor and the gain proportional to thermal noise are increased proportionally, thermal noise by the increase in the AGC amount and 1/f noise by the fluctuation of the electron multiplication of the solid image pickup device are equally not visible.

Accordingly, together with the reduction in the interdigital type fixed noise of the dark current by the reduction in the electron multiplication factor, more effective sensitivity can be obtained. Also, since the more effective sensitivity is obtained, an accumulation time can be reduced, and although it is moved, its monitoring can be facilitated.

Figure 3E:
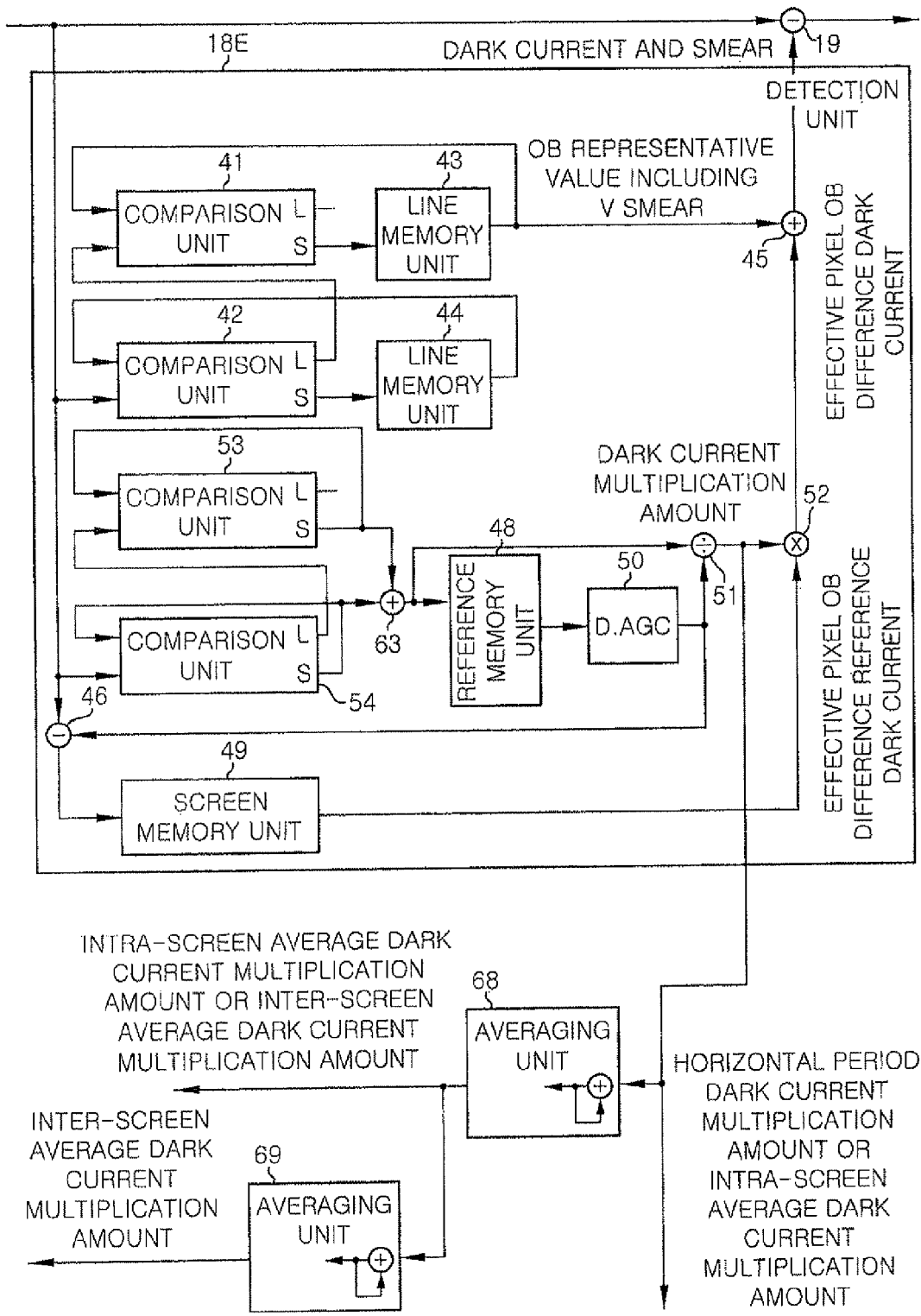
FIG. 3E is a block diagram showing an inner configuration of a detection unit for detecting not only a dark current, a smear and a multiplication unevenness but also a representative value of OB in accordance with the embodiment of the present invention.

Next, an embodiment illustrated in FIG. 3E will be described. The difference between FIGS. 3E and 3B is an addition of an adder 63. Here, a description of a detailed operation of other configuration than the adder 63 will be omitted.

In FIG. 3E, since the adder 63 is added, the second smallest signal of the V-OB and the H-OB of the CCD image pickup device and the sum of addition of the second smallest signal, rather than the second smallest signal of the V-OB and the H-OB of the CCD image pickup device, are used for the reference memory unit 48 and the divider 51 as a reference, and a dark current multiplication amount is calculated.

As a result, when the CCD image pickup device does not have a pixel with a very small dark current, the influence of noise on the second smallest signal is reduced and a high density dark current multiplication amount can be calculated.

Also, although not shown in FIG. 3E, the comparison unit 55 is added to an L output of the comparison unit 53, and the input of the adder 63 is an S output of the comparison unit 53 and an S output of the comparison unit 55, rather than the S output of the comparison unit 53 and an S output of the comparison unit 54.

As a result, although there is one pixel having a very little dark current in the H-OB of the V-OB of the CCD image pickup device, the influence of noise to the second smallest signal of the H-OB (parts) of the V-OB on the CCD image pickup device and the third smallest signal of the H-OB (parts) of the V-OB can be reduced, and a high density dark current multiplication amount can be calculated.

As discussed above, the image pickup apparatus using the image pickup device such as the EM-CCD or the like has been described in detail, but the present invention is not limited to the image pickup apparatus described herein and, of course, may be widely applicable to any other image pickup apparatuses using other CCD image pickup device, e.g., an IT (Interline Transfer)-CCD image pickup device or the like.

Embodiment 2

In an image pickup method of a solid image pickup apparatus having a CCD image pickup device providing an OB, a variable gain amplification unit (AGC), a line memory unit, and a screen memory unit, any one of a horizontal minimum value of a minimum value (smear representative value) of a vertical pixel of a V-OB, a minimum value of the V-OB, and a minimum value of an H-OB of the V-OB as a detection amount highly correlated to a dark current amount is determined as a representative value of a dark current and a recursive average between screens of the representative value of the dark current amount is determined as an average value of the dark current amount, and (1) it is plus-correlated to the average value of the dark current amount of the recursive average between screens, controls a variable gain amplification amount of an effective pixel signal, or controls an accumulation time.

Or, (2) it is plus-correlated to the dark current amount of each screen, and controls a variable gain amplification amount of the dark current component of the effective pixel signal and subtracts it from the effective pixel signal.

Or, (3) it is minus-correlated to the ratio between the average value of the dark current amount of the recursive average between screens and the dark current amount of each screen, controls the variable gain amplification amount of the effective pixel signal and corrects a multiplication fluctuation of a period longer than the vertical period.

Namely, the multiplication fluctuation according to the increase in the electron multiplication factor is restrained by lowering the variable gain amplification amount in the vertical period. Accordingly, noise in fluctuation of an image signal can be attenuated. The multiplication fluctuation of the vertical period and the fluctuation of the dark current are restrained.

When a correlation in a state in which noise other than the multiplication fluctuation and the fluctuation of the dark current is small is a proportion, the multiplication fluctuation and the fluctuation of the dark current are restrained to be as small as negligible, so the subtraction amount of the dark current component of the effective pixel signal can be uniform.

Specifically, a smear representative value is detected as a detection amount highly correlated to the dark current amount. A minimum value in a horizontal direction of a minimum value of the vertical pixel of the V-OB is calculated as a representative value of the dark current amount. Or, a minimum value of the V-OB may be detected to be used as a representative value of the dark current amount. Or, a minimum value of the H-OB of the V-OB may be detected to be used as a representative value of the dark current amount.

As described in Embodiment 1 of the present invention, the embodiments of FIGS. 3A to 3D have the function of detecting the dark current multiplication amount. Here, the averaging unit 68 including a register, an adder, and a counter recursive-averaging in a screen, and the averaging unit 69 including a register, an adder, and a counter recursive-averaging between screens may be used as an overall configuration of FIGS. 3A to 3D added to the detection unit of Embodiment 1. In this case, other configuration and operation than the averaging unit 68 and the averaging unit 69 are the same as those of Embodiment 1, so a description thereof will be omitted.

In FIGS. 3A to 3D, an intra-screen average dark current multiplication amount or an inter-screen average dark current multiplication amount is calculated from a horizontal period dark current multiplication amount or the intra-screen average dark current multiplication amount outputted from the detection units 18A to 18D according to recursive averaging of the averaging unit 68, and output to the outside (CPU 6 of FIG. 1A or CPU 6' of FIG. 1B) and also output to the averaging unit 69. Further, the current multiplication amount inputted to the averaging unit 69 is calculated as an inter-screen average dark current multiplication amount in the recursive average of the averaging unit 69 and output to the CPU 6 of FIG. 1A or CPU 6' of FIG. 1B.

In FIG. 1A or 1B, the CPU 6 or the CPU 6' controls the vertical transfer driving unit (w/TG) 13 or 13' to control an accumulation time. In addition, the CPU 6 (or CPU 6') controls the FEP 4 (or 10, 12) and controls variable gain amplification. Also, the CPU 6 (or CPU 6') controls the image signal processing unit 5 (or the image signal processing unit 5') including multiplication detection, controls variable gain amplification of a dark current component of an effective pixel signal, subtracts it from the effective pixel signal, and outputs the same.

Embodiment 3

Further, in an image pickup method of a solid image pickup apparatus including a CCD image pickup device providing an OB, a CDS for canceling noise from a signal outputted from the CCD image pickup device, a variable gain amplification (AGC) unit for adjusting a dark current correction and the gain of a signal, an ADC for converting a signal into a digital image signal Vi, and an FEP, an H-OB clamp in the FEP is stopped, and in the detection unit figures (FIGS. 3A to 3E) provided in an FPGA or the like, an average of M-N number (where M is a natural number and N is a natural number smaller than M) of H-OB excluding upper N among M number of H-OB, as an H-OB representative value (of a multiplication fluctuation component of the dark current), is subtracted from effective pixels of a corresponding line, and a pedestal level is stabilized by excluding N number of white blemishes of each H-OB.

Also, a variable gain amplification of the FEP is controlled by being minus-correlated to the ratio between the representative value of the H-OB and an average more than the vertical period of the representative value of the H-OB and the ratio between a recursive average in the vertical period of the representative value of the H-OB and the average more than the vertical period of the representative value of the H-OB, and a multiplication fluctuation of the period between the vertical periods from the horizontal period of the dark current is corrected in the AGC.

As a result, the influence of white blemish can be almost removed, excluding the upper N number. Here, since it is the average of M-N number, the influence of the fluctuation of the dark current of a short period smaller than M-N number is almost removed. Also, in the SDTV, the H-OB is generally 20, M is generally 17, and N is generally 4. Further, in an HDTV having horizontal effective pixels 1920, the H-OB is generally 55, M is generally 36, and N is generally 10. In addition, in an image pickup device having much white blemish, preferably, N is increased and in an image pickup device having less white blemish, preferably N is reduced.

Namely, N number of white blemishes of each H-OB is excluded to stabilize the pedestal level, negate the electron multiplication fluctuations of the horizontal period, and attenuate horizontal noise of an image signal.

For example, since the average from Nth to (N+4)th of the maximum value of the H-OB and the average from a minimum value to a fourth minimum value are increased by the same level by the horizontal smear, the average AVmaxn−n+4 from Nth to (N+4)th of the maximum value of the H-OB and the average AVmin−+4 from a minimum value to a fourth minimum value are increased in proportion to the dark current and the level of the white blemish according to the charge multiplication, the charge multiplication factor of equation 4 shown below can be obtained.

$$(AVmaxn-n+4-AVmin-+4)/(Refmaxn-n+4-Refmin-+4) \quad \text{Equation 4}$$

Further, in an image pickup method of a solid image pickup apparatus including a CCD image pickup device providing an OB, a variable gain amplification (AGC) unit, a line memory unit, and a screen memory unit, (1) it is plus-correlated to a recursive average of a minimum value of a V-OB of a detection amount highly correlated to a dark current amount, controls a variable gain amplification of an effective pixel signal, or controls an accumulation time.

Also, (2) it is plus-correlated to a recursive average of a minimum value of the V-OB of a detection amount highly correlated to a dark current amount, and controls a variable gain amplification of the dark current component of the effective pixel signal and subtracts it from the effective pixel signal.

Namely, the dark current component is greatly subtracted by any of methods of increasing a variable gain amplification and lengthening an accumulation time, whereby a multiplication fluctuation according to the increase in the electron multiplication factor is restrained. AS a result, horizontal noise of an image signal can be attenuated.

Specifically, with respect to FIG. 3D of a block diagram showing an internal configuration of a detection unit for detecting the representative value of the OB including a detection of a dark current, a smear, and a multiplication unevenness in accordance with one embodiment of the present invention, in the function of detecting the dark current multiplication amount described in Embodiment 1, the averaging unit 68 including a register, an adder, and a counter recursive-averaging in a screen, and an averaging unit 69 including a register, an adder, and a counter recursive-averaging between screens may be used as the overall configuration of FIG. 3D added to the detection unit of Embodiment 1.

Other configuration and operation than the averaging unit 68 and the averaging unit 69 are the same as those of Embodiment 1, so a description thereof will be omitted.

In FIG. 3D having the averaging unit 68 and the averaging unit 69, an intra-screen average dark current multiplication amount or an inter-screen average dark current multiplication amount is calculated from a horizontal period dark current multiplication amount or the intra-screen average dark current multiplication amount according to recursive averaging of the averaging unit 68, and an inter-screen average dark current multiplication amount is calculated according to recursive averaging of the averaging unit 69 and output to the CPU 6 of FIG. 1A or 1B.

In FIG. 1A (or 1B), the CPU 6 controls the vertical transfer driving unit (w/TG) 13 to control an accumulation time. Also, the CPU 6 controls the FEP 4 to control variable gain amplification. Further, the CPU controls the image signal processing unit 5 including multiplication detection, controls variable gain amplification of a dark current component of an effective pixel signal, subtracts it from the effective pixel signal.

And, (1) it is minus-correlated to the ratio between a recursive average amount of a horizontal period dark current multiplication amount or a recursive average amount in a screen of the horizontal period dark current multiplication amount and an inter-screen average dark current multiplication amount, and controls the variable gain amplification of the effective pixel signal. Namely, the multiplication fluctuation according to the increase in the electron multiplication factor is restrained by lowering the variable gain amplification amount in the horizontal period.

As a result, horizontal noise of an image signal can be attenuated. In this way, since the multiplication fluctuation of the vertical period and the fluctuation of the dark current are restrained, when a correlation in a state in which noise other than the multiplication fluctuation and the fluctuation of the dark current is small is a proportion, the multiplication fluctuation and the fluctuation of the dark current are restrained to be as small as negligible, so the subtraction amount of the dark current component of the effective pixel signal can be uniform.

Or, it is plus-correlated to a recursive average amount between screens of the horizontal period dark current multiplication amount, controls the variable gain amplification of the effective pixel signal, or controls an accumulation time. Namely, the horizontal noise of an image signal can be attenuated by restraining the multiplication fluctuation and dark current fluctuation according to the increase in the electron multiplication factor by increasing the variable gain amplification or lengthening the accumulation time. The multiplication fluctuation and dark current fluctuation are restrained.

When a correlation is a proportion, the multiplication fluctuation and the fluctuation of the dark current can be negligible, so the subtraction amount of the dark current component of the effective pixel signal can be uniform.

Also, (2) it is minus-correlated to the ratio between the recursive average amount between screens of a horizontal period dark current multiplication amount and a horizontal period dark current multiplication amount of each screen, and controls the variable gain amplification of the effective pixel signal. Namely, the multiplication fluctuation and the dark current fluctuation according to the increase in the electron multiplication factor are restrained by lowering the variable gain amplification in each screen. As a result, fluctuation noise of each screen of an image signal can be attenuated.

Thus, since the multiplication fluctuation of the vertical period and the fluctuation of the dark current of each screen are restrained, when a correlation in a state in which noise other than the multiplication fluctuation and the fluctuation of the dark current is small is a proportion, the multiplication fluctuation and the fluctuation of the dark current are restrained to be as small as negligible, so the subtraction amount of the dark current component of the effective pixel signal can be uniform.

Further, FIG. 6 is a schematic view showing a bounce of an H-OB clamp level. In FIG. 6, a vertical axis indicates a clamp level of the H-OB and the unit of a horizontal axis is a sampling period. The bound is generated in an electrostatic bonding, an electron bonding, or a potential change of power or GND.

As shown in the schematic view showing the bound of the clamp level of the H-OB in FIG. 6, when H-OB is 20, in an H-OB in which M is 17, the ADC has 4096 gray scales of 12 bits, and a dark current average D is 180, a simple average is 213 although it is a waveform fluctuation of a bound of attenuation vibration of a maximum one side amplitude 640.

As for an error 33 in this case, since a maximum value deletion average is 175 in accordance with one embodiment of the present invention, the error is 5(d−5). Also, since a maximum value and minimum value deletion average is 186 in accordance with one embodiment of the present invention, the error is 6(d+6). Further, since a deletion average of two maximum value and minimum value is 181 in accordance with one embodiment of the present invention, the error is reduced to gray scale resolution from 1(d+1).

Thus, when one embodiment of the present invention is applied, the error can be considerably reduced to be negligible virtually. In addition, in FIG. 6, in a broken line part, the level is (d−320), but it is 0(d−1870) in a range shortage.

As a result, although the phase of the waveform is shaken because of the infiltration of the sampling phase and the attenuated vibration, the H-OB clamp level is not changed, and thus, a change in the pedestal level, namely, low frequency noise, of the image of a horizontal period unit can be canceled and the picture quality of a dark portion can be improved. Also, the clamp phase is set to be small, but even when the phase is shaken and the bounce is increased, the error is reduced as described above.

In accordance with Embodiments 1, 2, and 3, since the CMG driving waveform is improved as high as to neglect a horizontal smear, the EM-CCD can be effective, and since the low frequency noise is reduced, the HDTV of the IT-CCD having a small horizontal smear can be effective.

What is claimed is:

1. An image pickup method using an image pickup apparatus including a charge coupled device (CCD) image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, and a subtraction unit for performing a variable gain amplification of the stored dark current component outputted from the effective pixels and subtracting it from the effective pixel signal, the method comprising:

controlling a variable gain amplification above a vertical period of the effective pixel signal in plus correlation with an average above the vertical period of the representative value of the signal outputted from the shaded pixels; and controlling a variable gain amplification of a horizontal period of the effective pixel signal in minus correlation with a ratio between a value of the horizontal period of the representative value and the average above the vertical period of the representative value or a ratio between a recursive average in screens of the representative value and the average above the vertical period of the representative value.

2. An image pickup method using an image pickup apparatus including a charge coupled device (CCD) image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, and a subtraction unit for performing a variable gain amplification of the stored dark current component outputted from the effective pixels and subtracting it from the effective pixel signal, the method comprising:

controlling, based on a vertical period of the representative value of the signal outputted from the shaded pixels, a variable gain amplification of the vertical period of the dark current component of the effective pixel signal to subtract it from the effective pixel signal; and controlling a variable gain amplification of the effective pixel signal in plus correlation with a recursive average between screens of the representative value.

3. An image pickup method using an image pickup apparatus including an electron multiplying-charge coupled device (CCD) image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, and a variable voltage electron multiplying electrode driving unit, the method comprising:

performing at least one of controlling, based on a vertical period of the representative value, a variable gain amplification of the vertical period of the dark current component of the effective pixel signal to subtract it from the effective pixel signal, and controlling a variable gain amplification of a horizontal period of the dark current component of the effective pixel signal, in plus correlation with a ratio between a value of the horizontal period of the representative value and an average above the vertical period of the representative value or a ratio between a recursive average in screens of the representative value and the average above the vertical period of the representative value, to subtract it from the effective pixel signal;

multiplying a ratio between a present value of the representative value of the signal outputted from the shaded pixels acquired by the second acquisition unit and an assumption value of the dark current which is obtained by correcting, with a temperature detected by the image pickup device, the representative value of the signal outputted from the shaded pixels acquired by the second acquisition unit and stored at as low electron multiplying electrode voltage as the electron multiplication is not performed by a reference dark current of the effective pixels stored when a non-electron multiplication was performed to subtract it from the effective pixel signal.

4. The image pickup method of claim 3, wherein the image pickup, apparatus further includes a temperature measuring unit and the image pickup device has a vertical-optical black (V-OB) and a horizontal-optical black (H-OB), and the method further comprises:

performing at least one of multiplying a ratio between a present representative value of the dark current of the V-OB and an assumption value of the dark current obtained by correcting, with a temperature measured by the image pickup device, a representative value of the dark current of the V-OB stored when the non-electron multiplication was performed by a reference dark current of each effective pixel stored within a screen memory when the non-electron multiplication was performed, to subtract it from the effective pixel signal; setting as a vertical smear a difference between maximum and minimum value of representative values between vertical pixels of present V-OB, and multiplying, if the vertical smear is less than a predetermined value, a ratio between a present representative value of the dark current of the H-OB and the assumption value of the dark current obtained by correcting, with the temperature measured by the image pickup device, the representative value of the dark current of the H-OB stored when the non-electron multiplication was performed by the reference dark current of each effective pixel stored within the screen memory when the non-electron multiplication was performed to subtract it from the effective pixel signal.

5. An image pickup method using an image pickup apparatus including a charge coupled device (CCD) image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, and a control unit for controlling accumulation time, wherein the screen memory further stores the effective pixel signal outputted from the effective pixels acquired by the first acquisition unit, the method comprising:

controlling a variable gain amplification of a horizontal period of the dark current component of the effective pixel signal, in plus correlation with a ratio between a value of the horizontal period of the representative value of the signal outputted from the shaded pixels and an average above a vertical period of the representative value or a ratio between a recursive average in screens of the representative value and the average above the vertical period of the representative value, to subtract it from the effective pixel signal; and controlling the accumulation time in plus correlation with a recursive average between screens of the representative value.

6. An image pickup method using an image pickup apparatus including an electron multiplying-charge coupled device (CCD) image pickup device, a variable voltage electron multiplying electrode driving unit, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a line memory for storing an effective pixel signal outputted from the effective pixels acquired by the first acquisition unit, and a screen memory for storing an effective pixel signal outputted from the effective pixels acquired by the first acquisition unit, the method comprising: comparing a square integral of difference of correlated portions between scanning line signals and a square integral of an error of averages of the correlated portions between the scanning line signals which represents a sum of a square integral of a ratio of averages of the correlated portions between the scanning line signals and a square integral of a difference of averages of the correlated portions between the scanning line signals;

performing at least any one of increasing an average variable gain amplification above a vertical period, decreasing a variable gain amplification of the vertical period of the effective pixel signal, decreasing a variable gain amplification of a horizontal period of the effective pixel signal, and decreasing an average electron multiplying electrode amplitude value above the vertical period, such that the square integral of difference of the correlated portions between the scanning line signals becomes to equal the square integral of the error of averages of the correlated portions between the scanning line signals.

7. The image pickup method of claim 6, wherein the image pickup apparatus further includes a temperature measuring unit and the image pickup device has a vertical-optical black (V-OB) and a horizontal-optical black (H-OB), and the method further comprises:

performing at least any one of averaging within a scanning line an image signal below a predetermined level, averaging within a screen the image signal below the predetermined level, averaging between screens the image signal below the predetermined level, and detecting a correlation between screens of the image signal and a motion vector to average between screens portions having a high correlation in an image signal of the motion vector below the predetermined level having over a predetermined correlation;

multiplying a ratio between a present representative value of the dark current of the V-OB and an assumption value of the dark current obtained by correcting, with a temperature measured by the image pickup device, a representative value of the dark current of the V-OB stored when a non-electron multiplication was performed by an average reference dark current of the effective pixels to subtract it from the effective pixel signal.

8. The image pickup method of claim 6, wherein the image pickup apparatus further includes a temperature measuring unit and the image pickup device has a vertical-optical black (V-OB) and a horizontal-optical black (H-OB), and the method further comprises:

controlling an intra-screen average value of an electron multiplying electrode amplitude and a variable gain amplification to uniformly control a predetermined level of an image signal, by using at least any one of the ratio between a present representative value of the dark current of the V-OB and an assumption value of the dark current obtained by correcting, with a temperature measured by the image pickup device, a representative value of the dark current of the V-OB stored when the non-electron multiplication was performed, the ratio between each V-OH of a multiplication factor of the dark current estimated by dividing it by a value obtained by calculating a representative value of the dark current of the V-OB when the non-multiplication was performed and temperature-correcting it and an average of the previous and subsequent V-OB, the ratio between a square integral of a signal ratio between an 1H line and a line having the highest correlation obtained by detecting correlations between the 1H line and the same line and upper and lower lines of a previous screen and a square integral of the signal difference between the 1H line and the line having the highest correlation, after multiplying a reference dark current of effective pixels of a screen memory by a multiplication factor of a dark current estimated by dividing it by a value obtained by calculating a representative value of the dark current of the V-OB obtained when the non-multiplication was performed and temperature-correcting it, and then subtracting the multiplication value from the effective pixel signal, the ratio between a low frequency component level and a high frequency component level of the signal difference between the 1H line and the line having the highest correlation, and the ratio between a value of a present variable gain amplification and an assumption value of the electron multiplication.

9. An image pickup method using an image pickup apparatus including an electron multiplying-charge coupled device (CCD) image pickup device, a variable voltage electron multiplying electrode driving unit, a first acquisition unit for acquiring an image signal outputted from effective pixels of a light-receiving face of the CCD image pickup device, a second acquisition unit for acquiring a signal outputted from shaded pixels of at least one of upper, lower, left, and right portions of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, a temperature measuring unit, a noise removing unit, and a 14-bit or higher analog digital converter, the method comprising:

comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen; and performing at least any one of calculating accumulation of a square of a ratio between non-recursive average components having high correlations, calculating accumulation of a square of a difference between non-recursive average components having high correlations, calculating a ratio between the accumulation of the square of the ratio and the accumulation of the square of the difference, controlling an intra-screen average value of a variable gain amplification and electron multiplying electrode amplitude such that the ratio becomes greater than a predetermined value, and uniformly controlling a predetermined level of an image signal; calculating a ratio between a low frequency component level and a high frequency component level of the square of the difference between non-recursive average components having high correlations, controlling the intra-screen average value of the variable gain amplification and the electron multiplying electrode amplitude such that the ratio becomes greater than the predetermined value, and uniformly controlling the predetermined level of the image signal; and calculating a ratio between a value of a present variable gain amplification and an assumption value of the electron multiplication, controlling the intra-screen average value of the variable gain amplification and the electron multiplying electrode amplitude such that the ratio becomes greater than the predetermined value, and uniformly controlling the predetermined level of the image signal.

10. An image pickup method using an image pickup apparatus including a charge coupled device (CCD) image pickup device, a first acquisition unit for acquiring an image signal outputted from effective pixels of a light-receiving face of the CCD image pickup device, a second acquisition unit for acquiring a signal outputted from a horizontal-optical black (H-OB) of shaded pixels of at least one of left and right portions of the light-receiving face of the CCD image pickup device, a calculation unit for calculating a representative value of the signal outputted from the H-OB of the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, a subtraction unit for performing a variable gain amplification of the stored dark current component outputted from the effective pixels and subtracting it from the effective pixel signal, a front end processor (FEP) containing a correlated double sampling unit for removing a noise from a signal outputted from the CCD image pickup device, an automatic gain control unit for adjusting gain of a signal, and an analog digital converter for converting to digital image signal Vi, and a digital image signal processing circuit, the method comprising:

in the digital image signal processing circuit, setting as a H-OB representative value an average of M-N number of H-OB excluding the upper N among M number of H-OB;

subtracting the H-OB representative value from an effective pixel signal of a corresponding line; and controlling a variable gain amplification of the FEP in minus correlation with a ratio between the H-OB representative value and an average above a vertical period of the H-OB representative value or a ratio between a recursive average within the vertical period of the H-OB representative value and an average above the vertical period of the H-OB representative value.

11. An image pickup apparatus comprising:
a charge coupled device (CCD) image pickup device;
a first acquisition unit for acquiring an image signal outputted from effective pixels of a light-receiving face of the CCD image pickup device;
a second acquisition unit for acquiring a signal outputted from shaded pixels of at least one of upper, lower, left, and right portions of the light-receiving face of the CCD image pickup device;
an automatic gain control unit;
a calculation unit for calculating a representative value of the signal outputted from the shaded pixels acquired by the second acquisition unit;
a screen memory for storing a dark current component outputted from the effective pixels acquired by the first acquisition unit;
a line memory for storing an effective pixel signal outputted from the effective pixels acquired by the first acquisition unit;
a subtraction unit for performing a variable gain amplification of the stored dark current component outputted from the effective pixels and subtracting it from the effective pixel signal; and
at least any one of groups including:
a first group containing a control unit for controlling a variable gain amplification above a vertical period of the effective pixel signal in plus correlation with an average above the vertical period of the representative value of the signal outputted from the shaded pixels, and a control unit for controlling a variable gain amplification of a horizontal period of the effective pixel signal in minus correlation with a ratio between a value of the horizontal period of the representative value and the average above the vertical period of the representative value or a ratio between a recursive average in screens of the representative value and the average above the vertical period of the representative value;

a second group containing a subtraction unit for controlling, based on a vertical period of the representative value of the signal outputted from the shaded pixels, a variable gain amplification of the vertical period of the dark current component of the effective pixel signal to subtract it from the effective pixel signal, and a control unit for controlling a variable gain amplification of the effective pixel signal in plus correlation with a recursive average between screens of the representative value;

a third group containing a subtraction unit for multiplying a ratio between a present value of the representative value of the signal outputted from the shaded pixels acquired by the second acquisition unit and an assumption value of the dark current which is obtained by correcting, with a temperature detected by the image pickup device, the representative value of the signal outputted from the shaded pixels acquired by the second acquisition unit and stored at as low electron multiplying electrode voltage as the electron multiplication is not performed by a reference dark current of the effective pixels stored when a non-electron multiplication was performed to subtract it from the effective pixel signal, and at least one of a subtraction unit for controlling, based on a vertical period of the representative value, a variable gain amplification of the vertical period of the dark current component of the effective pixel signal to subtract it from the effective pixel signal, and a subtraction unit for controlling a variable gain amplification of a horizontal period of the dark current component of the effective pixel signal, in plus correlation with a ratio between a value of the horizontal period of the representative value and an average above the vertical period of the representative value or a ratio between a recursive average in screens of the representative value and the average above the vertical period of the representative value, to subtract it from the effective pixel signal;

a fourth group containing the screen memory for further storing the effective pixel signal outputted from the effective pixels acquired by the first acquisition unit, a control unit for controlling accumulation time, a subtraction unit for controlling a variable gain amplification of a horizontal period of the dark current component of the effective pixel signal, in plus correlation with a ratio between a value of the horizontal period of the representative value of the signal outputted from the shaded pixels and an average above a vertical period of the representative value or a ratio between a recursive average in screens of the representative value and the average above the vertical period of the representative value, to subtract it from the effective pixel signal, and a control unit for controlling the accumulation time in plus correlation with a recursive average between screens of the representative value;

a fifth group containing the screen memory for further storing the effective pixel signal outputted from the effective pixels acquired by the first acquisition unit, an electron multiplying-CCD image pickup device, a variable voltage electron multiplying electrode driving unit, a control unit for comparing a square integral of difference of correlated portions between scanning line signals and a square integral of an error of averages of the correlated portions between the scanning line signals which represents a sum of a square integral of a ratio of averages of the correlated portions between the scanning line signals and a square integral of a difference of averages of the correlated portions between the scanning line signals and increasing an average variable gain amplification above a vertical period such that the square integral of difference of the correlated portions between the scanning line signals becomes to equal the square integral of the error of averages of the correlated portions between the scanning line signals, a control unit for decreasing a variable gain amplification of the vertical period of the effective pixel signal, a control unit for decreasing a variable gain amplification of a horizontal period of the effective pixel signal, and a control unit for decreasing an average electron multiplying electrode amplitude value above the vertical period;

a sixth group containing the electron multiplying-charge coupled device (CCD) image pickup device, the variable voltage electron multiplying electrode driving unit, a temperature measuring unit, a noise removing unit, a 14-bit or higher analog digital converter, a comparing unit for comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen, a calculation unit for calculating accumulation of a square of a ratio between non-recursive average components having high correlations, a calculation unit for calculating accumulation of a square of a difference between non-recursive average components having high correlations, a calculation unit for calculating a ratio between the accumulation of the square of the ratio and the accumulation of the square of the difference, a control unit for controlling an intra-screen average value of a variable gain amplification and electron multiplying electrode amplitude such that the ratio becomes greater than a predetermined value, and a control unit for uniformly controlling a predetermined level of an image signal;

a seventh group containing the electron multiplying-charge coupled device (CCD) image pickup device, the variable voltage electron multiplying electrode driving unit, the temperature measuring unit, the noise removing unit, the 14-bit or higher analog digital converter, a comparing unit for comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen, a calculation unit for calculating accumulation of a square of a ratio between non-recursive average components having high correlations, a calculation unit for calculating a ratio between a low frequency component level and a high frequency component level of the square of the difference between non-recursive average components having high correlations, a control unit for controlling the intra-screen average value of the variable gain amplification and the electron multiplying electrode amplitude such that the ratio becomes greater than the predetermined value, and a control unit for uniformly controlling the predetermined level of the image signal;

an eighth group containing the electron multiplying-charge coupled device (CCD) image pickup device, the variable voltage electron multiplying electrode driving unit, the temperature measuring unit, the noise removing unit, the 14-bit or higher analog digital converter, a comparing unit for comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen, a calculation unit for calculating a ratio between a value of a present variable gain amplification and an assumption value of the electron multiplication, a control unit for controlling the intra-screen average value of the variable gain amplification and the electron multiplying electrode amplitude such that the ratio becomes greater than the predetermined value, and a control unit for uniformly controlling the predetermined level of the image signal;

a ninth group containing a front end processor (FEP) having a correlated double sampling unit for removing a noise from a signal outputted from the CCD image pickup device having a horizontal-optical black (H-OB), an automatic gain control unit for adjusting gain of a signal, and an analog digital converter for converting to digital image signal Vi, and a digital image signal processing circuit, wherein the digital image signal processing circuit has a subtraction unit for setting as a H-OB representative value an average of M-N number of H-OB excluding the upper N among M number of H-OB and subtracting the H-OB representative value from an effective pixel signal of a corresponding line, and a control unit for controlling a variable gain amplification of the FEP in minus correlation with a ratio between the H-OB representative value and an average above a vertical period of the H-OB representative value or a ratio between a recursive average within the vertical period of the H-OB representative value and an average above the vertical period of the H-OB representative value.

12. An image pickup method using an image pickup apparatus including a charge coupled device (CCD) image pickup device, a first acquisition unit for acquiring an image signal outputted from effective pixels of a light-receiving face of the CCD image pickup device, a second acquisition unit for acquiring a signal outputted from shaded pixels of at least one of upper, lower, left, and right portion of the light-receiving face of the CCD image pickup device, an automatic gain control unit, a calculation unit for calculating a representative value of the signal outputted from the shaded pixels acquired by the second acquisition unit, a screen memory for storing a dark current component outputted from the effective pixels acquired by the first acquisition unit, a line memory for storing an effective pixel signal outputted from the effective pixels acquired by the first acquisition unit, and a subtraction unit for performing a variable gain amplification of the stored dark current component of the effective pixel signal and subtracting it from the effective pixel signal, the method comprising:

performing at least one of controlling a variable gain amplification of the effective pixel signal in correlation with the representative value, and controlling a variable gain amplification of the stored dark current component of the effective pixel signal, in plus correlation with the representative value, to subtract it from the effective pixel signal.

13. The image pickup method of claim 12, further comprising:

performing at least any one of controlling a variable gain amplification above a vertical period of the effective pixel signal in plus correlation with an average above the vertical period of the representative value; controlling a variable gain amplification of a horizontal period of the effective pixel signal, in minus correlation with a ratio between a value of the horizontal period of the representative value and an average above the vertical period of the representative value or a ratio between a recursive average in screens of the representative value and the average above the vertical period of the representative value; controlling, based on the vertical period of the representative value, a variable gain amplification of the vertical period of the dark current component of the effective pixel signal to subtract it from the effective pixel signal; controlling a variable gain amplification of a horizontal period of the dark current component of the effective pixel signal, in plus correlation with the ratio between the value of the horizontal period of the representative value and the average above the vertical period of the representative value or the ratio between the recursive average in screens of the representative value and the average above the vertical period of the representative value, to subtract it from the effective pixel signal.

14. The image pickup method of claim 13, wherein the image pickup apparatus further includes an electron multiplying-CCD image pickup device and a variable voltage electron multiplying electrode driving unit, and the method further comprises:

multiplying a ratio between a present value of the representative value of the signal outputted from the shaded pixels acquired by the second acquisition unit and an assumption value of the dark current which is obtained by correcting, with a temperature detected by the image pickup device, the representative value of the signal outputted from the shaded pixels acquired by the second acquisition unit and stored at as low electron multiplying electrode voltage as the electron multiplication is not performed by a reference dark current of the effective pixels stored when a non-electron multiplication was performed to subtract it from the effective pixel signal.

15. The image pickup method of claim 14, wherein the image pickup apparatus further includes a temperature measuring unit and the image pickup device has a vertical-optical black (V-OB) and a horizontal-optical black (H-OB), and the method further comprises:

performing at least one of multiplying a ratio between a present representative value of the dark current of the V-OB and an assumption value of the dark current obtained by correcting, with a temperature measured by the image pickup device, a representative value of the dark current of the V-OB stored when the non-electron multiplication was performed by a reference dark current of each effective pixel stored within a screen memory when the non-electron multiplication was performed, to subtract it from the effective pixel signal; setting as a vertical smear a difference between maximum and minimum value of representative values between vertical pixels of present V-OB, and multiplying, if the vertical smear is less than a predetermined value, the ratio between a present representative value of the dark current of the V-OB and the assumption value of the dark current obtained by correcting, with the temperature measured by the image pickup device, the representative value of the dark current of the V-OB stored when the non-electron multiplication was performed by the reference dark current of each effective pixel stored within a screen memory when the non-electron multiplication was performed to subtract it from the effective pixel signal.

16. The image pickup method of claim 13, wherein the screen memory further stores the effective pixel signal outputted from the effective pixels acquired by the first acquisition unit and the image pickup apparatus further includes a control unit for controlling accumulation time, and the method further comprises:

performing at least one of controlling a variable gain amplification of the effective pixel signal in plus correlation with a recursive average between screens of the representative value; and controlling accumulation time in plus correlation with a recursive average between screens of the representative value.

17. The image pickup method of claim 12, wherein the image pickup apparatus further includes an electron multiplying-CCD image pickup device and a variable voltage electron multiplying electrode driving unit, and the method further comprises:

comparing a square integral of difference of correlated portions between scanning line signals and a square integral of an error of averages of the correlated portions between the scanning line signals which represents a sum of a square integral of a ratio of averages of the correlated portions between the scanning line signals and a square integral of a difference of averages of the correlated portions between the scanning line signals;

performing at least any one of increasing an average variable gain amplification above a vertical period, decreasing a variable gain amplification of the vertical period of the effective pixel signal, decreasing a variable gain amplification of a horizontal period of the effective pixel signal, and decreasing an average electron multiplying electrode amplitude value, such that the square integral of difference of the correlated portions between the scanning line signals becomes to equal the square integral of the error of averages of the correlated portions between the scanning line signals.

18. The image pickup method of claim 17, wherein the image pickup apparatus further includes a temperature measuring unit and the image pickup device has a vertical-optical black (V-OB) and a horizontal-optical black (H-OB), and the method further comprises:

performing at least any one of averaging within a scanning line an image signal below a predetermined level, averaging within a screen the image signal below the predetermined level, averaging between screens the image signal below the predetermined level, and detecting a correlation between screens of the image signal and a motion vector to average between screens portions having a high correlation in an image signal of the motion vector below the predetermined level having over a predetermined correlation;

multiplying a ratio between a present representative value of the dark current of the V-OB and an assumption value of the dark current obtained by correcting, with a temperature measured by the image pickup device, a representative value of the dark current of the V-OB stored when a non-electron multiplication was performed by an average reference dark current of the effective pixels to subtract it from the effective pixel signal.

19. The image pickup method of claim 17, wherein the image pickup apparatus further includes a temperature measuring unit and the image pickup device has a vertical-optical black (V-OB) and a horizontal-optical black (H-OB), and the method further comprises:

controlling an intra-screen average value of an electron multiplying electrode amplitude and a variable gain amplification to uniformly control a predetermined level of an image signal, by using at least any one of the ratio between a present representative value of the dark current of the V-OB and an assumption value of the dark current obtained by correcting, with a temperature measured by the image pickup device, a representative value of the dark current of the V-OB stored when the non-electron multiplication was performed, the ratio between each V-OH of a multiplication factor of the dark current estimated by dividing it by a value obtained by calculating a representative value of the dark current of the V-OB when the non-multiplication was performed and temperature-correcting it and an average of the previous and subsequent V-OB, the ratio between a square integral of a signal ratio between an 1H line and a line having the highest correlation obtained by detecting correlations between the 1H line and the same line and upper and lower lines of a previous screen and a square integral of the signal difference between the 1H line and the line having the highest correlation, after multiplying a reference dark current of effective pixels of a screen memory by a multiplication factor of a dark current estimated by dividing it by a value obtained by calculating a representative value of the dark current of the V-OB obtained when the non-multiplication was performed and temperature-correcting it, and then subtracting the multiplication value from the effective pixel signal, the ratio between a low frequency component level and a high frequency component level of the signal difference between the 1H line and the line having the highest correlation, and the ratio between a value of a present variable gain amplification and an assumption value of the electron multiplication.

20. The image pickup apparatus, comprising:
an electron multiplying-charge coupled device (CCD) image pickup device;
a first acquisition unit for acquiring an image signal outputted from effective pixels of a light-receiving face of the CCD image pickup device;
a second acquisition unit for acquiring a signal outputted from shaded pixels of at least one of upper, lower, left, and right portions of the light-receiving face of the CCD image pickup device;
an automatic gain control unit;
a calculation unit for calculating a representative value of the signal outputted from the shaded pixels acquired by the second acquisition unit;
a screen memory for storing a dark current component outputted from the effective pixels acquired by the first acquisition unit;
a line memory for storing an effective pixel signal outputted from the effective pixels acquired by the first acquisition unit;
a subtraction unit for performing a variable gain amplification of the stored dark current component outputted from the effective pixels and subtracting it from the effective pixel signal;
a variable voltage electron multiplying electrode driving unit;
a temperature measuring unit;
a noise removing unit;
a 14-bit or higher analog digital converter;
a correlation comparison unit for comparing, when electron multiplication is performed, correlations of a non-recursive average component of an image signal of a present scanning line with a non-recursive average component of an image signal of a scanning line of a previous screen, a non-recursive average component of an image signal of a scanning line before 1H of the previous screen, and a non-recursive average component of an image signal of a scanning line after 1H of the previous screen;
a first accumulation unit for calculating accumulation of a square of a ratio between non-recursive average components having high correlations;
a second accumulation unit for calculating accumulation of a square of a difference between non-recursive average components having high correlations;
at least any one of a first ratio calculation unit for calculating a ratio between the accumulation of the square of the ratio and the accumulation of the square of the difference, a second ratio calculation unit for calculating a ratio between a low frequency component level and a high frequency component level of the square of the difference between non-recursive average components having high correlations, and a third ratio calculation unit for calculating a ration between the value of the present variable gain amplification and the assumption value of the electron multiplication;
a first control unit for controlling an intra-screen average value of a variable gain amplification and electron multiplying electrode amplitude such that the ratio becomes greater than a predetermined value; and
a second control unit for uniformly controlling a predetermined level of an image signal.

21. The image pickup method of claim 12, wherein the CCD image pickup device has a horizontal-optical black (H-OB), and the image pickup apparatus further includes a digital image signal processing circuit and a front end processor containing a correlated double sampling unit for removing a noise from a signal outputted from the CCD image pickup device, an automatic gain control unit for adjusting a dark current correction and a signal gain, and an analog digital converter for converting to digital image signal Vi, and the method comprises:

in the digital image signal processing circuit, setting as a H-OB representative value an average of MN number of H-OB excluding the upper N among M number of H-OB;
subtracting the H-OB representative value from an effective pixel signal of a corresponding line; and
controlling a variable gain amplification in minus correlation with a ratio between the H-OB representative value and an average above a vertical period of the H-OB representative value or a ratio between a recursive average within the vertical period of the H-OB representative value and an average above the vertical period of the H-OB representative value.

* * * * *